United States Patent
Iraha

(10) Patent No.: US 9,303,736 B2
(45) Date of Patent: Apr. 5, 2016

(54) CONTROL DEVICE FOR VEHICLE CONTINUOUSLY VARIABLE TRANSMISSION

(75) Inventor: Taira Iraha, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 347 days.

(21) Appl. No.: 14/124,101

(22) PCT Filed: May 25, 2012

(86) PCT No.: PCT/IB2012/001029
§ 371 (c)(1),
(2), (4) Date: Dec. 5, 2013

(87) PCT Pub. No.: WO2012/168774
PCT Pub. Date: Dec. 13, 2012

(65) Prior Publication Data
US 2014/0128187 A1    May 8, 2014

(30) Foreign Application Priority Data

Jun. 7, 2011    (JP) .................................. 2011-127126

(51) Int. Cl.
| | |
|---|---|
| F16H 9/12 | (2006.01) |
| F16H 61/02 | (2006.01) |
| F16H 61/12 | (2010.01) |
| F16H 61/662 | (2006.01) |

(52) U.S. Cl.
CPC ............ *F16H 9/125* (2013.01); *F16H 61/0206* (2013.01); *F16H 61/12* (2013.01); *F16H 61/66272* (2013.01); *F16H 61/66259* (2013.01); *F16H 2061/1224* (2013.01); *F16H 2061/1252* (2013.01); *F16H 2061/1264* (2013.01)

(58) Field of Classification Search
None
See application file for complete search history.

(56) References Cited

U.S. PATENT DOCUMENTS

| | | | | |
|---|---|---|---|---|
| 2,731,849 | A | * | 1/1956 | Rockwood et al. ....... F16H 9/16 474/11 |
| 4,400,939 | A | * | 8/1983 | Moranduzzo ......... F16H 61/468 60/431 |
| 4,685,357 | A | | 8/1987 | Sawada et al. |
| 2008/0209902 | A1 | * | 9/2008 | Vetter ..................... F16H 57/04 60/420 |

(Continued)

FOREIGN PATENT DOCUMENTS

| | | |
|---|---|---|
| CN | 101749413 A | 6/2010 |
| JP | 2007-177833 A | 7/2007 |
| JP | 2008-039154 A | 2/2008 |

(Continued)

*Primary Examiner* — Edwin A Young

(74) *Attorney, Agent, or Firm* — Kenyon & Kenyon LLP

(57) ABSTRACT

A control device for a vehicle continuously variable transmission that includes: an input-side variable pulley of which an effective diameter is variable; an output-side variable pulley of which an effective diameter is variable; a transmission belt that is wound between the input-side variable pulley and the output-side variable pulley; and a check valve that, on the basis of a first pressure that is one of an input-side pressure applied to the input-side variable pulley and an output-side pressure applied to the output-side variable pulley, regulates a second pressure that is the other one of the input-side pressure and the output-side pressure includes: a control unit that, when the second pressure is regulated by the check valve, controls the first pressure on the basis of a pressure required to suppress a slip of the transmission belt and a pressure required to achieve a target speed ratio.

7 Claims, 9 Drawing Sheets

(56) References Cited

U.S. PATENT DOCUMENTS

2010/0151977 A1   6/2010   Ogata
2011/0118066 A1*  5/2011   Fujimura ............... F16H 61/12
                                                           474/28

FOREIGN PATENT DOCUMENTS

| JP | 2010-241239 A | 10/2010 |
| JP | 2011069453 A | 4/2011 |

* cited by examiner

CONTROL DEVICE FOR VEHICLE CONTINUOUSLY VARIABLE TRANSMISSION

CROSS REFERENCE TO RELATED APPLICATION

This is a national phase application based on the PCT International Patent Application No. PCT/IB2012/001029 filed on May 25, 2012, claiming priority to Japanese application No. 2011-127126 filed Jun. 7, 2011, the entire contents of both of which are incorporated herein by reference.

BACKGROUND OF THE INVENTION

1. Field of the Invention

The invention relates to a control device for a vehicle continuously variable transmission (belt-type continuously variable transmission), which controls an input-side pressure and an output-side pressure to suppress a belt slip and to achieve a target speed ratio.

2. Description of Related Art

Japanese Patent Application Publication No. 2010-241239 (JP 2010-241239 A) describes a control device for a vehicle continuously variable transmission (hereinafter, continuously variable transmission). The continuously variable transmission has a pair of variable pulleys of which the effective diameter is variable. The variable pulleys are formed of an input-side variable pulley (a primary pulley, a primary sheave) and an output-side variable pulley (a secondary pulley, a secondary sheave). A transmission belt is wound between the pair of variable pulleys. An input-side pressure (primary pressure) in the primary pulley is controlled to thereby control an actual speed ratio so as to coincide with a target speed ratio. In addition, when the actual speed ratio is brought into coincidence with the target speed ratio, the primary pressure and an output-side pressure (secondary pressure) in the secondary pulley each are controlled to thereby suppress a slip of the transmission belt. The primary pressure is a value obtained by dividing a primary thrust force by a primary-side movable sheave pressure receiving area. Similarly, the secondary pressure is a value obtained by dividing a secondary thrust force by a secondary-side movable sheave pressure receiving area.

Generally, in a belt-type continuously variable transmission, a thrust force ratio (=secondary thrust force/primary thrust force) for keeping a target speed ratio is set. The primary pressure and the secondary pressure are controlled so as to achieve the thrust force ratio that gives the target speed ratio within the range in which no belt slip occurs.

In a belt-type continuously variable transmission, a fail-safe valve may be provided in preparation for a failure of a device (hydraulic circuit) associated with primary pulley-side pressure control. The fail-safe valve interrupts a path for supplying the primary pressure into a primary-side cylinder in the event of occurrence of a failure and communicates a path for supplying the secondary pressure into the primary-side cylinder. There is a case where the primary pressure and the secondary pressure are set so as to be equal to each other during operation of the fail-safe valve (during fail-safe operation). In this configuration, when the thrust force ratio is set so as to keep a bottom speed ratio (a maximum speed ratio $\gamma max$, a lowest gear ratio), the primary pressure with respect to the secondary pressure may be excessive. In addition, such a fail-safe valve may be operated during another control other than during fail-safe operation. In the case where the fail-safe valve is shared in this way, when the fail-safe valve is operated through another control while a target speed ratio (for example, the bottom speed ratio) is kept, it may be difficult to achieve the target speed ratio.

SUMMARY OF THE INVENTION

The invention provides a control device for a vehicle continuously variable transmission, which suppresses occurrence of a belt slip and achieves a target speed ratio when, on the basis of a first pressure that is one of an input-side pressure and an output-side pressure, a second pressure that is the other one of the input-side pressure and the output-side pressure is regulated by a check valve.

A first aspect of the invention relates to a control device for a vehicle continuously variable transmission. The vehicle continuously variable transmission includes: an input-side variable pulley of which an effective diameter is variable; an output-side variable pulley of which an effective diameter is variable; a transmission belt that is wound between the input-side variable pulley and the output-side variable pulley; and a check valve that, on the basis of a first pressure that is one of an input-side pressure applied to the input-side variable pulley and an output-side pressure applied to the output-side variable pulley, regulates a second pressure that is the other one of the input-side pressure and the output-side pressure. The control device includes a control unit that, when the second pressure is regulated by the check valve, controls the first pressure on the basis of a pressure required to suppress a slip of the transmission belt and a pressure required to achieve a target speed ratio.

The control device for a vehicle continuously variable transmission according to the first aspect includes the check valve that regulates the second pressure on the basis of the first pressure. Therefore, in comparison with the case where the pressure of the input-side variable pulley and the pressure of the output-side variable pulley are configured to be equal to each other, a wider thrust force ratio may be obtained. Thus, the width of a feasible speed ratio is further widened. For example, it is easy to achieve a thrust force ratio by which a bottom speed ratio is kept. In addition, when the second pressure is regulated by the check valve, the first pressure is controlled on the basis of the pressure required to suppress a slip of the transmission belt and a pressure required to achieve the target speed ratio. Therefore, occurrence of a slip of the transmission belt is suppressed, and the target speed ratio may be achieved. For example, when the target speed ratio is a bottom speed ratio, an unnecessary upshift is suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Embodiment

Figure 1:
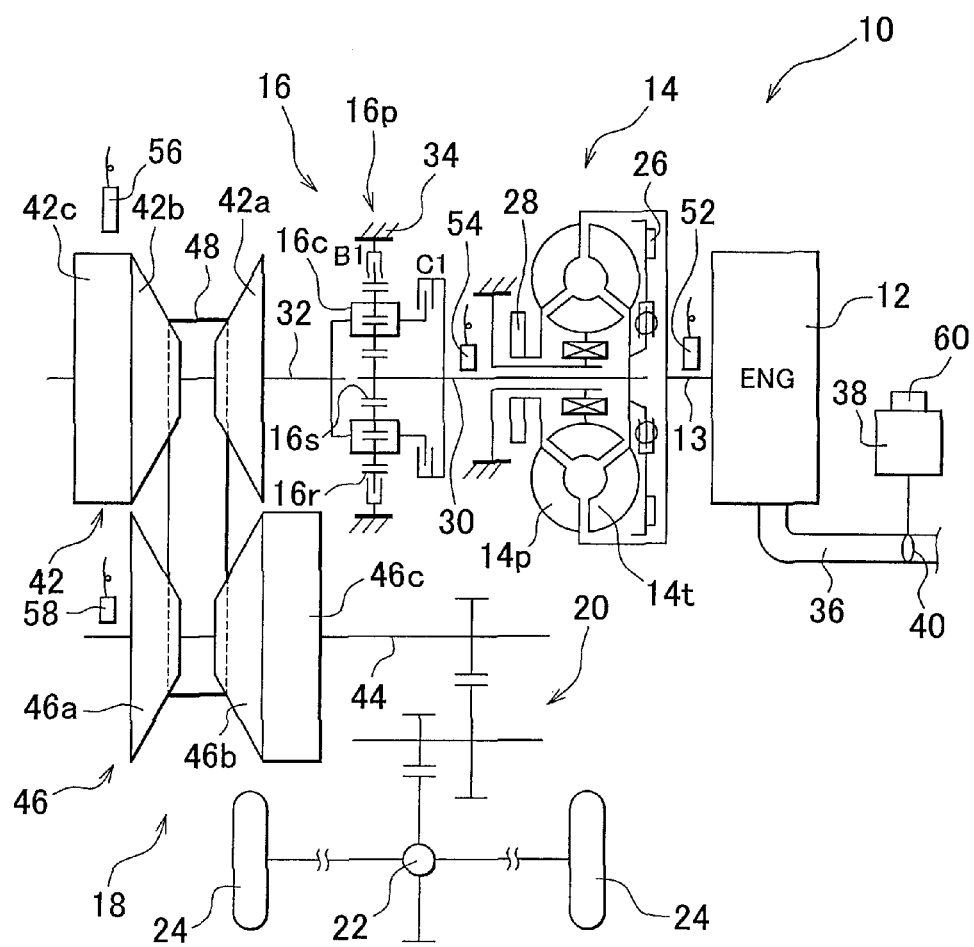
FIG. 1 is a view that illustrates the schematic configuration of a power transmission path that constitutes a vehicle to which the aspect of the invention is applied.

FIG. 1 is a view that illustrates the schematic configuration of a power transmission path that constitutes a vehicle 10 to which the aspect of the invention is applied. The power transmission path is routed from an engine 12 to drive wheels 24. The engine 12 is used as a driving force source for propelling the vehicle 10. As shown in FIG. 1, for example, power generated by the engine 12 is transmitted to the right and left drive wheels 24 via a torque converter 14, a forward-reverse switching device 16, a belt-type continuously variable transmission (hereinafter, continuously variable transmission or CVT) 18, a reduction gear 20, a differential gear unit 22, and the like, sequentially. The continuously variable transmission 18 functions as a vehicle continuously variable transmission.

The torque converter 14 includes a pump impeller 14$p$, a turbine shaft 30 and a turbine impeller 14$t$. The pump impeller 14$p$ is coupled to a crankshaft 13 of the engine 12. The turbine shaft 30 functions as an output-side member of the torque converter 14. The turbine impeller 14$t$ is coupled to the forward-reverse switching device 16 via the turbine shaft 30. The torque converter 14 is a fluid transmission device that transmits power via fluid. In addition, a lock-up clutch 26 is provided between the pump impeller 14$p$ and the turbine impeller 14$t$. When the lock-up clutch 26 is completely engaged, the pump impeller 14$p$ and the turbine impeller 14$t$ integrally rotate. A mechanical oil pump 28 is coupled to the pump impeller 14$p$. The oil pump 28 is driven by the engine 12 for rotation to generate working hydraulic pressure. The working hydraulic pressure is utilized in the following applications: shift control over the continuously variable transmission 18; belt clamping pressure control over the continuously variable transmission 18; torque capacity control over the lock-up clutch 26; changing the power transmission path of the forward-reverse switching device 16; and supplying lubricating oil to various portions of the power transmission path.

The forward-reverse switching device 16 mainly includes a forward clutch C1, a reverse brake B1 and a double pinion-type planetary gear set 16$p$. The turbine shaft 30 of the torque converter 14 is integrally coupled to a sun gear 16$s$. An input shaft 32 of the continuously variable transmission 18 is integrally coupled to a carrier 16$c$. Any one of the carrier 16$c$ and the sun gear 16$s$ is selectively coupled via the forward clutch C1. A ring gear 16$r$ is selectively fixed to a housing 34 via the reverse brake B1. The housing 34 functions as a non-rotating member. The forward clutch C1 and the reverse brake B1 function as interrupting devices. The forward clutch C1 and the reverse brake B1 each are a hydraulic frictional engagement device that is frictionally engaged by supplying hydraulic pressure to a corresponding hydraulic cylinder.

When the forward clutch C1 is engaged and the reverse brake B1 is released, the forward-reverse switching device 16 is placed in an integrally rotatable state. In the integrally rotatable state, the turbine shaft 30 is directly coupled to the input shaft 32. In the integrally rotatable state, the forward-reverse switching device 16 forms a forward power transmission path. When the forward power transmission path is formed, forward driving force is transmitted to the continuously variable transmission 18. In addition, when the reverse brake B1 is engaged and the forward clutch C1 is released, the forward-reverse switching device 16 forms a reverse power transmission path. When the reverse power transmission path is formed, the input shaft 32 rotates in a direction opposite to a direction in which the turbine shaft 30 rotates, and reverse driving force is transmitted to the continuously variable transmission 18. In addition, when both the forward clutch C1 and the reverse brake B1 are released, the forward-reverse switching device 16 is placed in a neutral state (power transmission cut-off state) in which power transmission is cut off.

The engine 12 is formed of an internal combustion engine, such as a gasoline engine and a diesel engine. An electronic throttle valve 40 is arranged in an intake pipe 36 of the engine 12. The electronic throttle valve 40 controls the intake air flow rate $Q_{AIR}$ of the engine 12. The electronic throttle valve 40 is electrically controlled by a throttle actuator 38.

The continuously variable transmission 18 is formed to include an input-side variable pulley (a primary pulley, a primary sheave) 42, an output-side variable pulley (a secondary pulley, a secondary sheave) 46, and a transmission belt 48 that is wound between the input-side variable pulley 42 and the output-side variable pulley 46. The primary pulley 42 is an input-side member mounted on the input shaft 32, and has a variable effective diameter. The secondary pulley 46 is an output-side member mounted on the output shaft 44, and has a variable effective diameter. The primary pulley 42 and the secondary pulley 46 constitute the pair of variable pulleys 42 and 46. Power is transmitted by friction between the pair of variable pulleys 42 and 46 and the transmission belt 48.

The primary pulley 42 includes a fixed rotary body (fixed sheave) 42$a$, a movable rotary body (movable sheave) 42$b$ and an input-side hydraulic cylinder (primary hydraulic cylinder) 42$c$. The fixed sheave 42$a$ is an input-side fixed rotary body fixed to the input shaft 32. The movable sheave 42$b$ is an input-side movable rotary body. The movable sheave 42$b$ is not rotatable relatively about its axis with respect to the input shaft 32. On the other hand, the movable sheave 42$a$ is relatively movable in the axial direction with respect to the input shaft 32. The primary hydraulic cylinder 42$c$ is a hydraulic actuator that applies an input-side thrust force (primary thrust force) Win (=primary pressure Pin×pressure receiving area of the movable sheave 42$b$). When the primary thrust force Win is applied, the V groove width between the fixed sheave 42$a$ and the movable sheave 42$b$ is changed. In addition, the secondary pulley 46 includes a fixed rotary body (fixed sheave) 46a, a movable rotary body (movable sheave) 46b and an output-side hydraulic cylinder (secondary hydraulic cylinder) 46c. The fixed sheave 46a is an output-side fixed rotary body fixed to the output shaft 44. The movable sheave 46b is an output-side movable rotary body. The movable sheave 46b is not relatively rotatable about its axis with respect to the output shaft 44. On the other hand, the movable sheave 46b is relatively movable in the axial direction with respect to the output shaft 44. The secondary hydraulic cylinder 46c is a hydraulic actuator that applies an output-side thrust force (secondary thrust force) Wout (=secondary pressure Pout×pressure receiving area of the movable sheave 46b). When the secondary thrust force Wout is applied, the V groove width between the fixed sheave 46a and the movable sheave 46b is changed.

Figure 3:
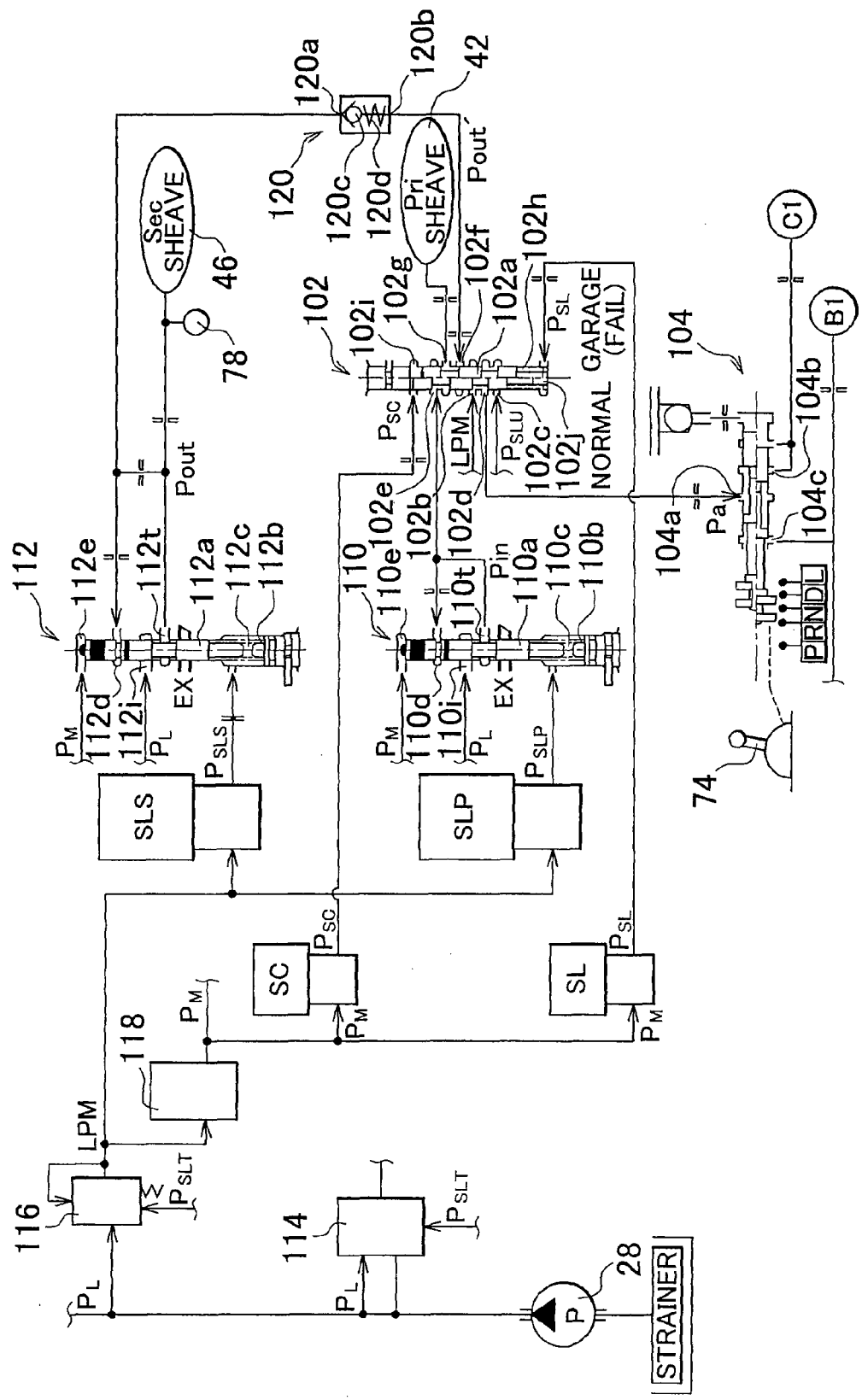
FIG. 3 is a hydraulic circuit diagram that shows a relevant portion associated with hydraulic pressure control for a shift, or the like, of a continuously variable transmission within a hydraulic pressure control circuit.

Then, a primary pressure Pin and a secondary pressure Pout are independently regulated by a hydraulic pressure control circuit 100 (see FIG. 3). By so doing, the primary thrust force Win and the secondary thrust force Wout each are directly or indirectly controlled. Here, the primary pressure Pin is an input-side pressure applied to the primary pulley 42. That is, the primary pressure Pin is a hydraulic pressure applied to a fluid chamber in the primary hydraulic cylinder 42c. The secondary pressure Pout is an output-side pressure applied to the secondary pulley 46. That is, the secondary pressure Pout is a hydraulic pressure applied to a fluid chamber in the secondary hydraulic cylinder 46c. When the primary thrust force Win and the secondary thrust force Wout each are controlled, the V groove widths of the pair of variable pulleys 42 and 46 change to vary the turning radii (effective diameters) of the transmission belt 48. When the effective diameters are varied, a speed ratio (gear ratio) γ (=input shaft rotation speed $N_{IN}$/output shaft rotation speed $N_{OUT}$) is continuously varied. In addition, with a variation in the speed ratio γ, friction (belt clamping force) between the pair of variable pulleys 42 and 46 and the transmission belt 48 is controlled so as not to cause a slip of the transmission belt 48. In this way, when the primary pressure Pin and the secondary pressure Pout each are controlled, a slip of the transmission belt 48 is suppressed while an actual speed ratio γ is brought to a target speed ratio γ*. Note that the input shaft rotation speed $N_{IN}$ is the rotation speed of the input shaft 32, and the output shaft rotation speed $N_{OUT}$ is the rotation speed of the output shaft 44. In addition, in the present embodiment, as is apparent from FIG. 1, the input shaft rotation speed $N_{IN}$ is equal to the rotation speed of the primary pulley 42, and the output shaft rotation speed $N_{OUT}$ is equal to the rotation speed of the secondary pulley 46.

In the continuously variable transmission 18, for example, when the primary pressure Pin is increased, the V groove width of the primary pulley 42 is narrowed to decrease the speed ratio γ. That is, the continuously variable transmission 18 upshifts. In addition, when the primary pressure Pin is decreased, the V groove width of the primary pulley 42 is widened to increase the speed ratio γ. That is, the continuously variable transmission 18 downshifts. Thus, when the V groove width of the primary pulley 42 is minimized, the speed ratio γ of the continuously variable transmission 18 becomes a minimum speed ratio γmin (a top speed ratio, a highest gear ratio). In addition, when the V groove width of the primary pulley 42 is maximized, the speed ratio γ of the continuously variable transmission 18 becomes a maximum speed ratio γmax (a bottom speed ratio, a lowest gear ratio). By controlling the primary pressure Pin and the secondary pressure Pout, a slip of the transmission belt 48 (belt slip) is suppressed while the target speed ratio γ* is achieved. That is, the primary pressure Pin and the secondary pressure Pout correlate with each other. Thus, only control over one of the pulley pressures does not achieve a target shift, that is, suppressing a belt slip and achieving a target speed ratio. As is already described above, the primary pressure Pin is directly proportional to the primary thrust force Win. Similarly, the secondary pressure Pout is directly proportional to the secondary thrust force Wout. Thus, pressure control may be replaced with thrust force control. In addition, pressure control and thrust force control may be combined with each other.

Figure 2:
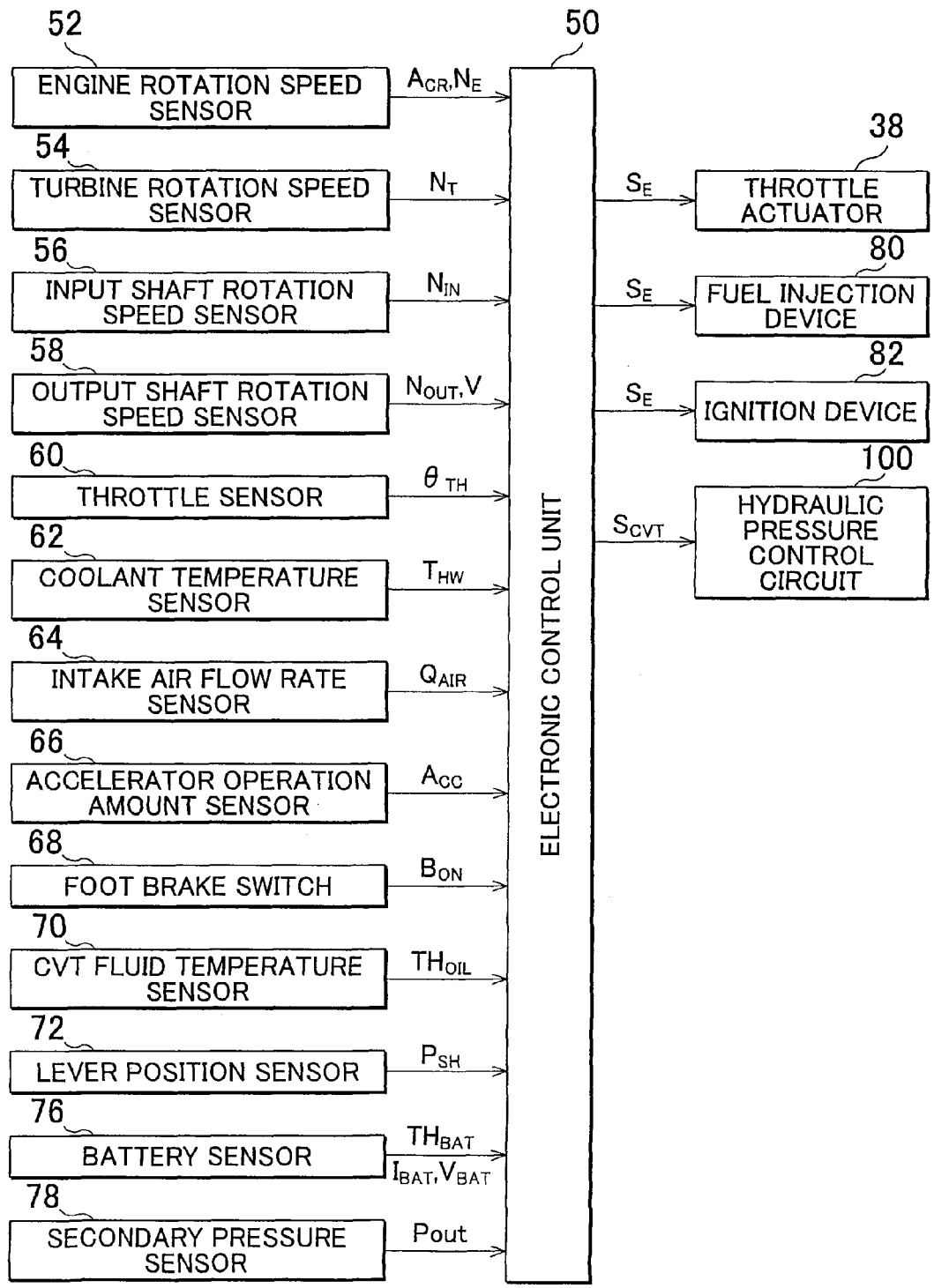
FIG. 2 is a block diagram that illustrates a relevant portion of a control system provided for the vehicle.

FIG. 2 is a block diagram that illustrates a relevant portion of a control system provided for the vehicle 10. The relevant portion of the control system includes devices for controlling the engine 12, the continuously variable transmission 18, and the like. As shown in FIG. 2, the vehicle 10 includes an electronic control unit 50. The electronic control unit 50 includes a control device for a vehicle continuously variable transmission, associated with shift control over the continuously variable transmission 18, or the like. The electronic control unit 50 is a so-called microcomputer that includes, for example, a CPU, a RAM, a ROM, an input/output interface, and the like. The CPU uses the temporary storage function of the RAM to carry out signal processing in accordance with a program prestored in the ROM. By so doing, the CPU executes various controls over the vehicle 10. For example, the electronic control unit 50 executes output control over the engine 12, shift control and belt clamping force control over the continuously variable transmission 18, torque capacity control over the lock-up clutch 26, and the like. In addition, the electronic control unit 50 is formed separately into an electronic control unit for engine control, an electronic control unit for hydraulic pressure control over the continuously variable transmission 18 and the lock-up clutch 26, and the like, where necessary.

The electronic control unit 50 is, for example, supplied with signals corresponding to the following parameters or states: the rotation angle (position) $A_{CR}$ of the crankshaft 13; the rotation speed (engine rotation speed) $N_E$ of the of the engine 12; the rotation speed (turbine rotation speed) $N_T$ of the turbine shaft 30; the input shaft rotation speed $N_{IN}$ of the continuously variable transmission 18; the output shaft rotation speed $N_{OUT}$ of the continuously variable transmission 18; the throttle valve opening degree $\theta_{TH}$ of the electronic throttle valve 40; the coolant temperature $TH_W$ of the engine 12; the intake air flow rate $Q_{AIR}$ of the engine 12; an accelerator operation amount Acc; a brake on $B_{ON}$; the fluid temperature $TH_{OIL}$ of working fluid of the continuously variable transmission 18, and the like; the lever position (operating position) $P_{SH}$ of a shift lever 74; a battery temperature $TH_{BAT}$; a battery input/output current (battery charge/discharge current) $I_{BAT}$; a battery voltage $V_{BAT}$; and the secondary pressure Pout. The position $A_{CR}$ and the engine rotation speed $N_E$ are detected by an engine rotation speed sensor 52. The signal that indicates the turbine rotation speed $N_T$ is detected by a turbine rotation speed sensor 54. The signal that indicates the input shaft rotation speed $N_{IN}$ is detected by an input shaft rotation speed sensor 56. The signal that indicates the output shaft rotation speed $N_{OUT}$ is detected by an output shaft rotation speed sensor 58. The output shaft rotation speed $N_{OUT}$ corresponds to a vehicle speed V. The signal that indicates the throttle valve opening degree $\theta_{TH}$ is detected by a throttle sensor 60. The signal that indicates the coolant temperature $TH_W$ is detected by a coolant temperature sensor 62. The signal that indicates the intake air flow rate $Q_{AIR}$ is detected by an intake air flow rate sensor 64. The signal that indicates the accelerator operation amount Acc is detected by an accelerator operation amount sensor 66. The accelerator operation amount Acc is the operation amount of an accelerator pedal as the amount of acceleration required by a driver. The signal that indicates the brake on $B_{ON}$ is detected by a foot brake switch 68. The signal that indicates the brake on $B_{ON}$ is a signal that indicates the state where a foot brake that is a service brake is operated. The signal that indicates the fluid temperature $TH_{OIL}$ is detected by a CVT fluid temperature sensor 70. The signal that indicates the lever position (operating position) $P_{SH}$ is detected by a lever position sensor 72. The battery temperature $TH_{BAT}$ is detected by a battery sensor 76. The signal that indicates the secondary pressure Pout is detected by a secondary pressure sensor 78. The secondary pressure Pout is a hydraulic pressure supplied to the secondary pulley 46. Note that the electronic control unit 50, for example, sequentially calculates the state of charge (charged capacity) SOC of a battery (electrical storage device) on the basis of the battery temperature $TH_{BAT}$, the battery charge/discharge current $I_{BAT}$, the battery voltage $V_{BAT}$, and the like. In addition, the electronic control unit 50, for example, sequentially calculates the actual speed ratio $\gamma$ ($=N_{IN}/N_{OUT}$) of the continuously variable transmission 18 on the basis of the output shaft rotation speed $N_{OUT}$ and the input shaft rotation speed $N_{IN}$.

In addition, an engine output control command signal $S_E$, a hydraulic pressure control command signal $S_{CVT}$, and the like, are output from the electronic control unit 50. The engine output control command signal $S_E$ is a signal for output control over the engine 12. The hydraulic pressure control command signal $S_{CVT}$ is a signal for hydraulic pressure control associated with a shift of the continuously variable transmission 18. Specifically, a throttle signal, an injection signal, an ignition timing signal, and the like, are output as the engine output control command signal $S_E$. The throttle signal is a signal for driving the throttle actuator 38 to control the on/off states of the electronic throttle valve 40. The injection signal is a signal for controlling the amount of fuel injected from a fuel injection device 80. The ignition timing signal is a signal for controlling the ignition timing of the engine 12 by an ignition device 82. In addition, for example, the following signals are output to the hydraulic pressure control circuit 100 as the above hydraulic pressure control command signal $S_{CVT}$: a command signal for driving a first linear solenoid valve SLP that regulates the primary pressure Pin; a command signal for driving a second linear solenoid valve SLS that regulates the secondary pressure Pout; and a command signal for driving a third linear solenoid valve SLT that controls a line hydraulic pressure $P_L$.

The shift lever 74 may be arranged near a driver's seat and manually operated. In addition, the shift lever 74 may be configured to be operated to any one of sequentially arranged five lever positions "P", "R", "N", "D" and "L". At the "P" position (range), the power transmission path of the vehicle 10 is released. That is, at the "P" position, the vehicle 10 is placed in a neutral state in which power transmission is cut off. Furthermore, at the "P" position, rotation of the output shaft 44 is mechanically locked by a mechanical parking mechanism. In this way, the "P" position is a parking position. The "R" position is a reverse running position at which the rotation direction of the output shaft 44 is reversed. The "N" position is a neutral position at which the vehicle 10 is placed in a neutral state. The "D" position is a forward running position at which an automatic shift mode is established within a shift range in which a shift of the continuously variable transmission 18 is allowed to thereby execute automatic shift control. The "L" position is an engine brake position at which strong engine brake may be applied. In this way, the "P" position and the "N" position each are a non-running position that is selected when the power transmission path is placed in a neutral state and the vehicle is not caused to run. The "R" position, the "D" position and the "L" position each are a running position that is selected when power transmission of the power transmission path is allowed to cause the vehicle to run.

FIG. 3 is a hydraulic circuit diagram that shows a relevant portion associated with hydraulic pressure control for a shift, or the like, of the continuously variable transmission 18 within the hydraulic pressure control circuit 100. The relevant portion associated with hydraulic pressure control includes a relevant portion associated with engagement operation of the forward clutch C1 or reverse brake B1, involved in operation of the shift lever 74.

As shown in FIG. 3, the hydraulic pressure control circuit 100 is configured to include: the oil pump 28; a clutch apply control valve 102; a manual valve 104; a primary pressure control valve 110; a secondary pressure control valve 112; a primary regulator valve 114; a line hydraulic pressure modulator valve 116; a modulator valve 118; a check valve 120; a selector valve SC; a selector valve SL; the first linear solenoid valve SLP, the second linear solenoid valve SLS, the third linear solenoid valve SLT; and a fourth linear solenoid valve SLU. The clutch apply control valve 102 changes working fluid supplied to the forward clutch C1 and the reverse brake B1. The manual valve 104 mechanically changes a fluid passage in accordance with operation of the shift lever 74. By so doing, the forward clutch C1 and the reverse brake B1 each are selectively engaged or released. The primary pressure control valve 110 regulates the primary pressure Pin. The secondary pressure control valve 112 regulates the secondary pressure Pout. The primary regulator valve 114 regulates the line hydraulic pressure $P_L$ to a value corresponding to an engine load, or the like, on the basis of a control hydraulic pressure $P_{SLT}$ (described later). The source pressure of the line hydraulic pressure is working hydraulic pressure output from (generated by) the oil pump 28. That is, the primary regulator valve 114 is a relief valve. The line hydraulic pressure modulator valve 116 outputs an output hydraulic pressure LPM at a set pressure corresponding to an engine load, or the like, on the basis of the control hydraulic pressure $P_{SLT}$ (described later). The source pressure of the output hydraulic pressure LPM is the line hydraulic pressure $P_L$. The modulator valve 118 outputs a modulator hydraulic pressure $P_M$ regulated to a set pressure. The source pressure of the modulator hydraulic pressure $P_M$ is the output hydraulic pressure LPM. The check valve 120 suppresses the primary pressure Pin flowing into the fluid passage adjacent to the secondary pulley 46, and allows the secondary pressure Pout to flow into the fluid passage adjacent to the primary pulley 42. The selector valve SC is an on-off solenoid valve that uses the modulator hydraulic pressure $P_M$ as the source pressure to output a selector hydraulic pressure $P_{SC}$. The selector valve SL is an on-off solenoid valve that uses the modulator hydraulic pressure $P_M$ as the source pressure to output a selector hydraulic pressure $P_{SL}$. The first linear solenoid valve SLP, the second linear solenoid valve SLS, the third linear solenoid valve SLT and the fourth linear solenoid valve SLU respectively output a control hydraulic pressure $P_{SLP}$, a control hydraulic pressure $P_{SLS}$, the control hydraulic pressure $P_{SLT}$ and a control hydraulic pressure $P_{SLU}$. The control hydraulic pressure $P_{SLP}$, the control hydraulic pressure $P_{SLS}$, the control hydraulic pressure $P_{SLT}$ and the control hydraulic pressure $P_{SLU}$ are hydraulic pressures that use the output hydraulic pressure LPM as the source pressure and that are output in correspondence with driving currents supplied from the electronic control unit 50.

The clutch apply control valve 102 changes the supply state of working fluid supplied to the forward clutch C1 and the reverse brake B1 via the manual valve 104. The supply state is changed in accordance with the output state of the selector valve SC and the output state of the selector valve SL. That is, the clutch apply control valve 102 functions as a selector valve. The clutch apply control valve 102 has a spool valve element 102a that is movable in the axial direction. The spool valve element 102a is positioned at any one of a normal side (left side in FIG. 3) and a garage side (failure side, and right side in FIG. 3). At the normal side, working fluid supplied to the forward clutch C1 and the reverse brake B1 has the output hydraulic pressure LPM. When the spool valve element 102a is positioned at the garage side, working fluid supplied to the forward clutch C1 and the reverse brake B1 has the control hydraulic pressure $P_{SLU}$. In addition, the clutch apply control valve 102 has a first input port 102b, a second input port 102c, a first output port 102d, a third input port 102e, a fourth input port 102f and a second output port 102g. The output hydraulic pressure LPM is input to the first input port 102b. The control hydraulic pressure $P_{SLU}$ is input to the second input port 102c. The first output port 102d is connected to a manual input port 104a of the manual valve 104. In addition, the first output port 102d is in fluid communication with any one of the first input port 102b and the second input port 102c on the basis of a selected position of the spool valve element 102a. The primary pressure Pin is input to the third input port 102e. The secondary pressure Pout is input to the fourth input port 102f via the check valve 120. The second output port 102g is connected to the primary pulley 42. In addition, the second output port 102g is in fluid communication with any one of the third input port 102e and the fourth input port 102f on the basis of a selected position of the spool valve element 102a. Furthermore, the clutch apply control valve 102 has a spring 102h, a selecting fluid chamber 102i and a selecting fluid chamber 102j. The spring 102h urges the spool valve element 102a toward the normal side. When the selector hydraulic pressure $P_{SC}$ is supplied to the selecting fluid chamber 102i, thrust force toward the garage side is applied to the spool valve element 102a. When the selector hydraulic pressure $P_{SL}$, is supplied to the selecting fluid chamber 102j, thrust force toward the normal side is applied to the spool valve element 102a.

In this clutch apply control valve 102, for example, when the selector hydraulic pressure $P_{SC}$ of the selector valve SC is supplied to the selecting fluid chamber 102i, the spool valve element 102a moves toward the garage side against the urging force of the spring 102h. At this time, the second input port 102c and the first output port 102d are in fluid communication with each other. In addition, the fourth input port 102f and the second output port 102g are in fluid communication with each other. By so doing, the secondary pressure Pout flowing via the check valve 120 is supplied to the primary pulley 42. On the other hand, the control hydraulic pressure $P_{SLU}$ of the fourth linear solenoid valve SLU is supplied to the manual input port 104a. That is, the control hydraulic pressure $P_{SLU}$ of the fourth linear solenoid valve SLU is an engaging hydraulic pressure of the forward clutch C1 (or the reverse brake B1). The control hydraulic pressure $P_{SLU}$ linearly varies on the basis of the duty ratio of exciting current supplied to the fourth linear solenoid valve SLU. Thus, by varying the control hydraulic pressure $P_{SLU}$, an engaging transitional hydraulic pressure in the engaging process of the forward clutch C1 (or the reverse brake B1) varies. Hereinafter, a garage shift will be described as an example of varying the control hydraulic pressure $P_{SLU}$. The garage shift is a shift that the shift lever 74 is operated from the "N" position to the "D" position or the "R" position during a predetermined low vehicle speed, during a vehicle stop, or the like (N to D shift or N to R shift). At the time of this garage shift, the control hydraulic pressure $P_{SLU}$ may be regulated such that the forward clutch C1 (or the reverse brake B1) is smoothly engaged and an engaging shock is suppressed. In this way, the control hydraulic pressure $P_{SLU}$ may be regulated in accordance with a predetermined rule.

On the other hand, when no selector hydraulic pressure $P_{SC}$ is output from the selector valve SC or when the selector hydraulic pressure $P_{SL}$ of the selector valve SL is supplied to the selecting fluid chamber 102j, the spool valve element 102a moves toward the normal side. At this time, the first input port 102b and the first output port 102d are in fluid communication with each other. In addition, the third input port 102e and the second output port 102g are in fluid communication with each other. By so doing, the primary pressure Pin is supplied to the primary pulley 42. On the other hand, the output hydraulic pressure LPM is supplied to the manual input port 104a. That is, the output hydraulic pressure LPM is an engaging hydraulic pressure of the forward clutch C1 (or the reverse brake B1). The output hydraulic pressure LPM is a set pressure regulated on the basis of an engine load, or the like (for example, an input torque $T_{IN}$). Thus, after completion of engagement of the forward clutch C1 (or the reverse brake B1), it is possible to stably hold the engaged state. For example, during a steady state, or the like, after the garage shift that the forward clutch C1 (or the reverse brake B1) is engaged, the output hydraulic pressure LPM is regulated to a hydraulic pressure that is obtained by adding a hydraulic pressure, corresponding to the control hydraulic pressure $P_{SLT}$, to a predetermined set pressure. By so doing, the forward clutch C1 (or the reverse brake B1) is placed in a completely engaged state.

In the manual valve 104, an engaging hydraulic pressure Pa (the control hydraulic pressure $P_{SLU}$ or the output hydraulic pressure LPM) is supplied to the manual input port 104a. The engaging hydraulic pressure is output from the first output port 102d of the clutch apply control valve 102. Then, when the shift lever 74 is operated to the "D" position or the "L" position, the engaging hydraulic pressure Pa is supplied to the forward clutch C1 via a forward output port 104b. By so doing, the forward clutch C1 is engaged. In addition, when the shift lever 74 is operated to the "R" position, the engaging hydraulic pressure Pa is supplied to the reverse brake B1 via a reverse output port 104c. By so doing, the reverse brake B1 is engaged. In addition, when the shift lever 74 is operated to the "P" position or the "N" position, both the fluid passage from the manual input port 104a to the forward output port 104b and the fluid passage from the manual input port 104a to the reverse output port 104c are shut off. Furthermore, communication of each of the fluid passage for draining working fluid from the forward clutch C1 and the fluid passage for draining working fluid from the reverse brake B1 is provided. By so doing, the forward clutch C1 and the reverse brake B1 both are released.

The primary pressure control valve 110 is formed to include a spool valve element 110a, a spring 110b, a control fluid chamber 110c, a feedback fluid chamber 110d and a modulator fluid chamber 110e. The spool valve element 110a is provided movably in the axial direction. When the spool valve element 110a moves in the axial direction, a primary input port 110i opens or closes. When the primary input port 110i is open, the line hydraulic pressure $P_L$ is supplied from the primary input port 110i to the third input port 102e of the clutch apply control valve 102 via a primary output port 110t. That is, the line hydraulic pressure $P_L$ is supplied to the primary sheave 42 as the primary pressure Pin. The spring 110*b* urges the spool valve element 110*a* in the valve opening direction. The spring 110*b* is accommodated in the control fluid chamber 110*c*. The control hydraulic pressure $P_{SLP}$ is supplied to the control fluid chamber 110*c*. By so doing, thrust force in the valve opening direction is applied to the spool valve element 110*a*. The line hydraulic pressure $P_L$ output from the primary output port 110*t* is supplied to the feedback fluid chamber 110*d*. By so doing, thrust force in the valve closing direction is applied to the spool valve element 110*a*. The modulator hydraulic pressure $P_M$ is supplied to the modulator fluid chamber 110*e*. By so doing, thrust force in the valve closing direction is applied to the spool valve element 110*a*. The thus configured primary pressure control valve 110 regulates the line hydraulic pressure $P_L$ as the primary pressure Pin. In this regulation, the control hydraulic pressure $P_{SLP}$ is supplied as a pilot pressure. By so doing, the primary pressure control valve 110 supplies the primary pressure Pin to the fluid chamber in the primary hydraulic cylinder 42*c* via the clutch apply control valve 102. For example, when the control hydraulic pressure $P_{SLP}$ increases, the spool valve element 110*a* moves upward in FIG. 3. By so doing, the primary pressure Pin increases. On the other hand, when the control hydraulic pressure $P_{SLP}$ decreases, the spool valve element 110*a* moves downward in FIG. 3. By so doing, the primary pressure Pin decreases.

The secondary pressure control valve 112 is formed to include a spool valve element 112*a*, a spring 112*b*, a control fluid chamber 112*c*, a modulator fluid chamber 112*e* and a feedback fluid chamber 112*d*. The spool valve element 112*a* is provided movably in the axial direction. When the spool valve element 112*a* moves in the axial direction, a secondary input port 112*i* opens or closes. When the secondary input port 112*i* is open, the line hydraulic pressure $P_L$ is supplied from the secondary input port 112*i* to the secondary pulley 46 via a secondary output port 112*t*. That is, the line hydraulic pressure $P_L$ is supplied to the secondary pulley 46 as the secondary pressure Pout. The spring 112*b* urges the spool valve element 112*a* in the valve opening direction. The spring 112*b* is accommodated in the control fluid chamber 112*c*. The control hydraulic pressure $P_{SLS}$ is supplied to the control fluid chamber 112*c*, and thrust force in the valve opening direction is applied to the spool valve element 112*a*. The secondary pressure Pout output from the secondary output port 112*t* is supplied to the feedback fluid chamber 112*d*. By so doing, thrust force in the valve closing direction is applied to the spool valve element 112*a*. The modulator hydraulic pressure $P_M$ is supplied to the modulator fluid chamber 112*e*. By so doing, thrust force in the valve closing direction is applied to the spool valve element 112*a*. The thus configured secondary pressure control valve 112 regulates the line hydraulic pressure $P_L$ as the secondary pressure Pout. In this regulation, the control hydraulic pressure $P_{SLS}$ is supplied as a pilot pressure. By so doing, the secondary pressure control valve 112 supplies the secondary pressure Pout to the fluid chamber in the secondary hydraulic cylinder 46*c*. For example, when the control hydraulic pressure $P_{SLS}$ increases, the spool valve element 112*a* moves upward in FIG. 3. By so doing, the secondary pressure Pout increases. On the other hand, when the control hydraulic pressure $P_{SLS}$ decreases, the spool valve element 112*a* moves downward in FIG. 3. By so doing, the secondary pressure Pout decreases.

In the thus configured hydraulic pressure control circuit 100, the primary pressure Pin and the secondary pressure Pout may be respectively supplied to the pair of variable pulleys 42 and 46 such that a belt slip is suppressed and a belt clamping force is not excessive. As described above, the primary pressure Pin is regulated by the first linear solenoid valve SLP, and the secondary pressure Pout is regulated by the second linear solenoid valve SLS. In addition, the thrust force ratio τ (=Wout/Win) of the pair of variable pulleys 42 and 46 is changed on the basis of the correlation between the primary pressure Pin and the secondary pressure Pout. By changing the thrust force ratio τ, the speed ratio γ of the continuously variable transmission 18 is varied. For example, as the thrust force ratio τ is increased, the speed ratio γ increases (that is, the continuously variable transmission 18 downshifts).

Figure 4:
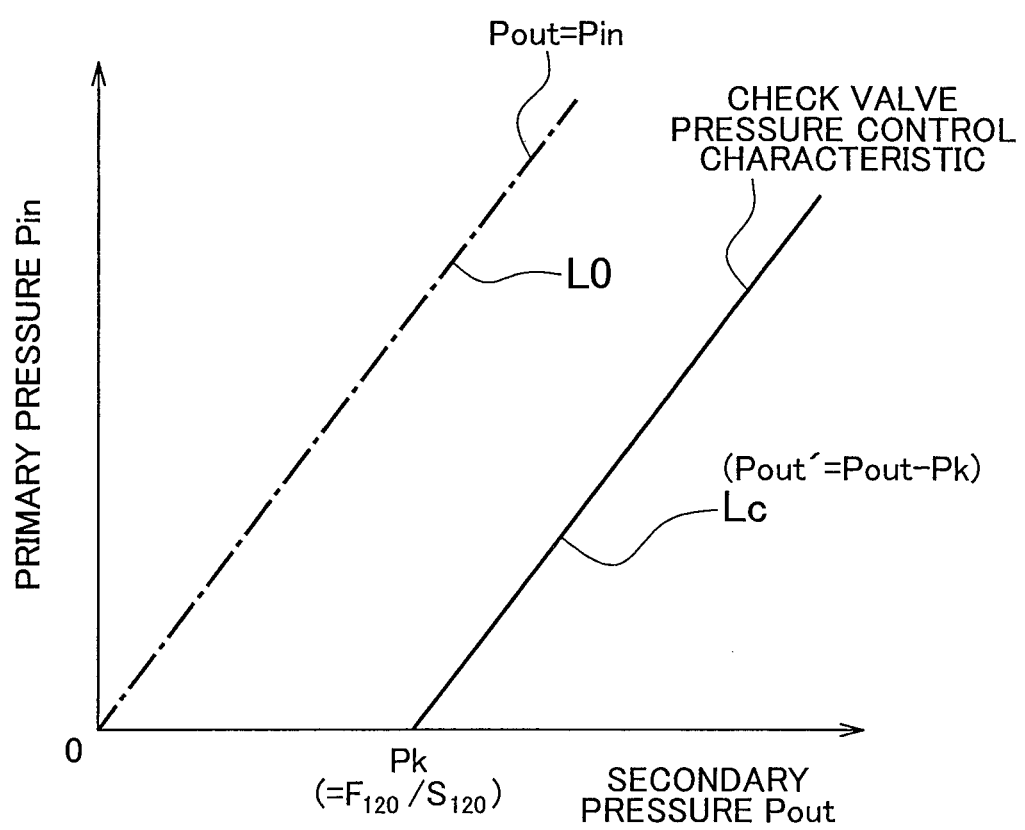
FIG. 4 is a graph that shows an example of a check valve pressure control characteristic (solid line)

The check valve 120 is formed to include a poppet 120*c* and a spring 120*d*. The poppet 120*c* opens or closes a check input port 120*a*. When the check input port 120*a* opens, the secondary pressure Pout is supplied from the check input port 120*a* to the fourth input port 102*f* of the clutch apply control valve 102 via a check output port 120*b*. By so doing, the secondary pressure Pout is supplied as the primary pressure Pin. The spring 120*d* urges the poppet 120*c* in the direction to close the check input port 120*a*. In the thus configured check valve 120, the opening operation of the check input port 120*a* will be described. When the check input port 120*a* is closed by the poppet 120*c*, the secondary pressure Pout is supplied to the poppet 120*c* from the check input port 120*a*. When the pressing force (=Pout×pressure receiving area $S_{120}$ of the poppet 120*c*) caused by the secondary pressure Pout exceeds the urging force $F_{120}$ of the spring 120*d*, the check input port 120*a* and the check output port 120*b* are in fluid communication with each other. Then, the secondary pressure Pout is supplied to the fourth input port 102*f* via the check output port 120*b*. That is, as shown by the check valve pressure control characteristic (solid line Lc) of FIG. 4, when the secondary pressure Pout exceeds a cracking pressure Pk (=$F_{120}/S_{120}$), a regulated secondary pressure Pout' (=Pout−Pk) is supplied to the fourth input port 102*f* as the primary pressure Pin. Here, the regulated secondary pressure Pout' is part of the secondary pressure, exceeding the cracking pressure Pk. In this way, the check valve 120 regulates the primary pressure Pin to a predetermined pressure (for example, solid line Lc) based on the secondary pressure Pout. Note that, in FIG. 4, the line L0 indicated by the alternate long and short dash line indicates the secondary pressure Pout supplied to the fourth input port 102*f* as the primary pressure Pin in the case where no check valve 120 is provided. In addition, here, the check valve 120 is described so as to regulate the primary pressure Pin. The regulation made by the check valve 120 here means that the primary pressure Pin is set to a predetermined pressure (regulated secondary pressure Pout') based on the secondary pressure Pout depending on the mechanically determined check valve pressure control characteristic of the check valve 120. In other words, regulation made by the check valve 120 means that the secondary pressure Pout is reduced and the regulated secondary pressure Pout' is output as the primary pressure Pin.

Here, the hydraulic pressure control circuit 100 according to the present embodiment is formed to include the clutch apply control valve 102. Therefore, the hydraulic pressure supplied to the primary pulley 42 may be changed to any one of the primary pressure Pin and the regulated secondary pressure Pout' via the check valve 120. Thus, in the event of a failure in which the primary pressure Pin is not normally output, the selector hydraulic pressure $P_{SC}$ may be supplied to change the spool valve element 102*a* toward the garage side. By so doing, it is possible to execute fail-safe operation for supplying the regulated secondary pressure Pout' from the second output port 102*g* to the primary pulley 42. Here, the regulated secondary pressure Pout' is supplied from the fourth input port 102*f* to the second output port 102*g* via the check valve 120. Note that the above failure is presumably, for example, an abnormal output of the control hydraulic pressure $P_{SLP}$, valve sticking of the primary pressure control valve 110, or the like. In addition, particularly, the fail-safe operation may be executed in the event of a failure that causes an unintended downshift to occur.

The clutch apply control valve 102 changes the engaging hydraulic pressure, supplied to the forward clutch C1 (or the reverse brake B1), to the output hydraulic pressure LPM during a steady operation. On the other hand, the clutch apply control valve 102 changes the engaging hydraulic pressure to the control hydraulic pressure $P_{SLU}$ during a garage shift. That is, the clutch apply control valve 102 functions as a garage shift valve. In addition, the clutch apply control valve 102 changes the hydraulic pressure, supplied to the primary pulley 42, to the primary pressure Pin during a normal operation. On the other hand, the clutch apply control valve 102 changes the hydraulic pressure, supplied to the primary pulley 42, to the secondary pressure Pout via the check valve 120 in the event of a failure. That is, the clutch apply control valve 102 also functions as a fail-safe valve.

Figure 5:
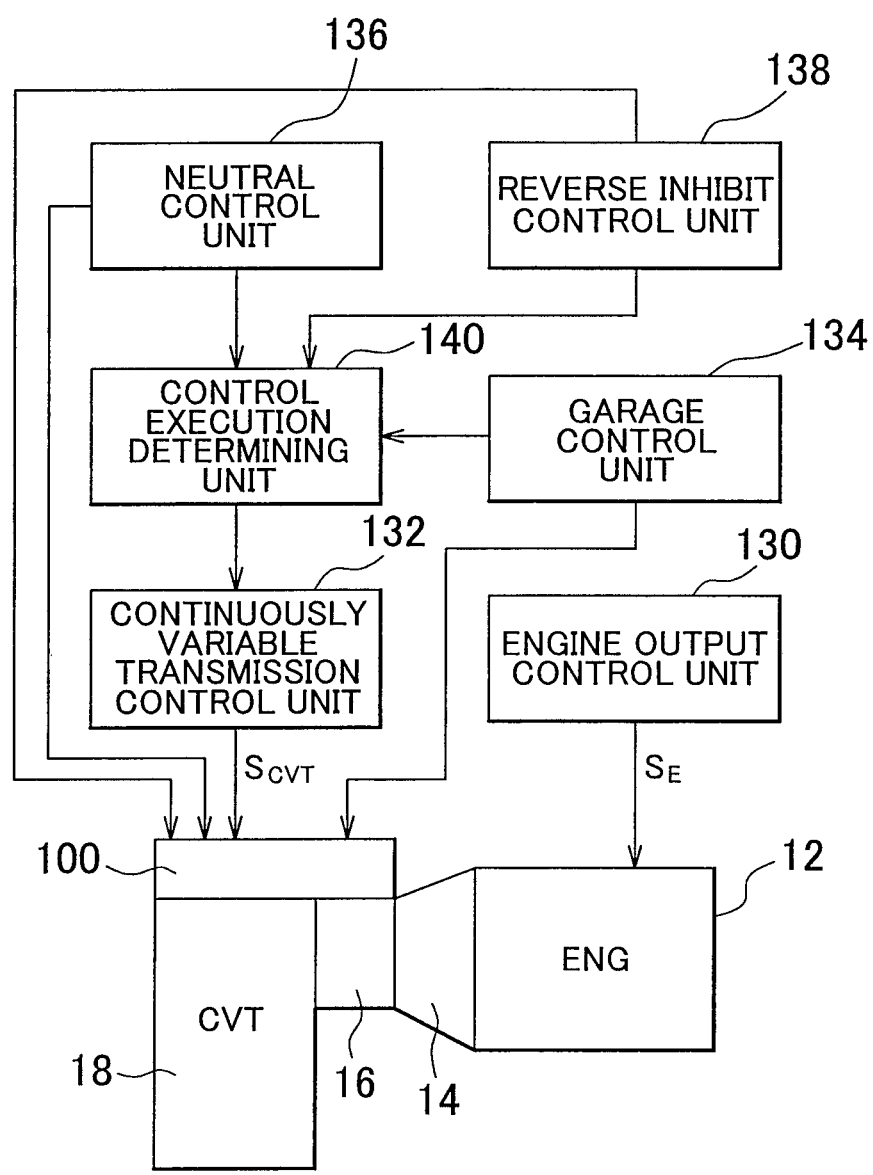
FIG. 5 is a functional block diagram that illustrates a relevant portion of control functions of an electronic control unit.

FIG. 5 is a functional block diagram that illustrates a relevant portion of control functions of the electronic control unit 50. As shown in FIG. 5, an engine output control unit 130 outputs the engine output control command signal $S_E$, such as the throttle signal, the injection signal and the ignition timing signal, to the throttle actuator 38, the fuel injection device 80 or the ignition device 82. By so doing, output of the engine 12 is controlled. For example, the engine output control unit 130 sets the target engine torque $T_E^*$, and uses the throttle actuator 38 to control the open/close states of the electronic throttle valve 40 so as to obtain the target engine torque $T_E^*$. Alternatively, the engine output control unit 130 uses the fuel injection device 80 to control the fuel injection amount or uses the ignition device 82 to control the ignition timing. Here, the target engine torque $T_E^*$ may be set so as to obtain a driving force (driving torque) corresponding to the accelerator operation amount Acc.

A continuously variable transmission control unit 132 outputs a primary command pressure Pintgt and a secondary command pressure Pouttgt to the hydraulic pressure control circuit 100. The continuously variable transmission control unit 132 determines, for example, the primary command pressure Pintgt and secondary command pressure Pouttgt so as to achieve the target speed ratio γ* while suppressing a belt slip of the continuously variable transmission 18. Specifically, the continuously variable transmission control unit 132 may determine the primary command pressure Pintgt and secondary command pressure Pouttgt so as to obtain a thrust force ratio τ for achieving the target speed ratio γ* while ensuring a thrust force (required thrust force) required to suppress a belt slip with a minimum necessary thrust force. The required thrust force is a thrust force that is larger than a thrust force at which a belt slip occurs. In addition, the required thrust force may be a thrust force that is slightly larger than the thrust force at which a belt slip occurs, that is, a belt slip limit thrust force (hereinafter, slip limit thrust force). Here, the primary command pressure Pintgt corresponds to a command value of the primary pressure Pin (or a target primary pressure Pin*). In addition, the secondary command pressure Pouttgt corresponds to a command value of the secondary pressure Pout (or a target secondary pressure Pout*).

Figure 6:
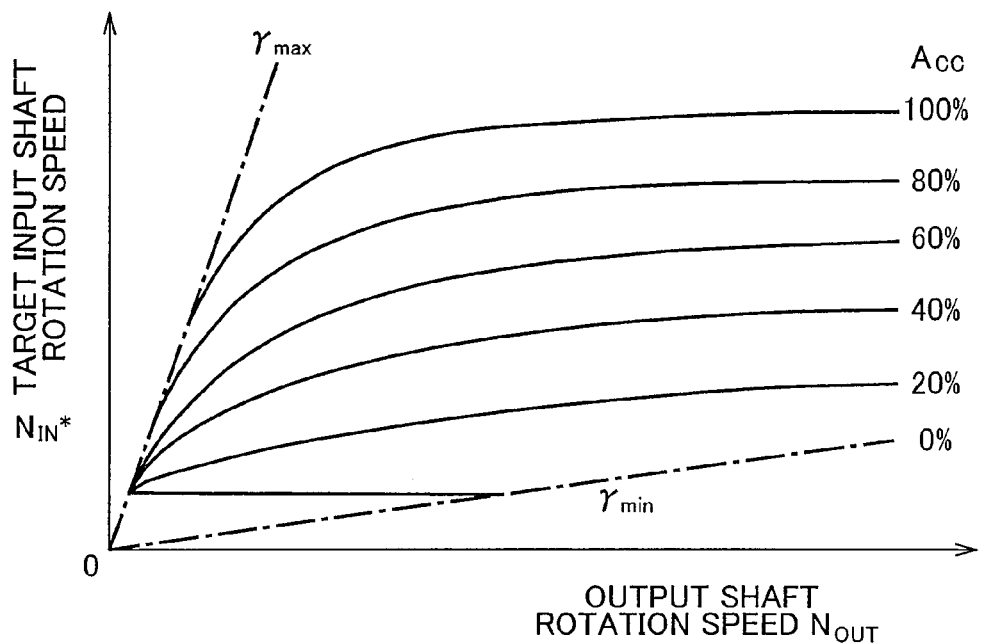
FIG. 6 is a view that shows an example of a shift map used at the time of obtaining a target input shaft rotation speed in hydraulic pressure control for a shift of the continuously variable transmission.

Specifically, the continuously variable transmission control unit 132 determines a post-shift target speed ratio γ*1, which is the target speed ratio γ after shifting, of the continuously variable transmission 18. The continuously variable transmission control unit 132, for example, sets a target input shaft rotation speed $N_{IN}^*$ on the basis of a vehicle state indicated by an actual output shaft rotation speed $N_{OUT}$ and an accelerator operation amount Acc from a shift map shown in FIG. 6. Then, the continuously variable transmission control unit 132 calculates the post-shift target speed ratio γ*1 ($=N_{IN}^*/N_{OUT}$) on the basis of the target input shaft rotation speed $M_N^*$ from the shift map. The shift map is a map that stores the correlation between an output shaft rotation speed $N_{OUT}$ and a target input shaft rotation speed $N_{IN}^*$, which is obtained in advance using an accelerator operation amount Acc as a parameter. The shift map corresponds to a shift condition. In the shift map, the target input shaft rotation speed $N_{IN}^*$ is set such that the speed ratio γ increases as the output shaft rotation speed $N_{OUT}$ decreases or as the accelerator operation amount Acc increases. The post-shift target speed ratio γ*1 is set within the range between the minimum speed ratio γmin (the top speed ratio, the highest gear ratio) and the maximum speed ratio γmax (the bottom speed ratio, the lowest gear ratio) of the continuously variable transmission 18. Then, the continuously variable transmission control unit 132 determines the target speed ratio γ* as a transitional target value of the speed ratio γ during shifting. The target speed ratio γ* is determined on the basis of the speed ratio γ before the start of shifting, the post-shift target speed ratio γ*1 and the difference therebetween. The correlation among the speed ratio γ, the post-shift target speed ratio γ*1 and the target speed ratio γ* may be, for example, empirically set in advance so as to achieve a quick and smooth shift. The continuously variable transmission control unit 132 determines the target speed ratio γ*, which is sequentially varied during shifting, as a function of an elapsed time. The function of an elapsed time may be a function that varies along a smooth curve (for example, a first order lag curve or a second order lag curve) that smoothly varies toward the post-shift target speed ratio γ*1 from the start of shifting. That is, the continuously variable transmission control unit 132 sequentially varies the target speed ratio γ* with an elapsed time from the start of shifting during a shift of the continuously variable transmission 18. γ* is varied to approach the post-shift target speed ratio γ*1 from the speed ratio γ before the start of shifting. In addition, when the continuously variable transmission control unit 132 determines the target speed ratio γ* as a function of the elapsed time, the continuously variable transmission control unit 132 calculates a target shift speed during shifting from the target speed ratio γ*. For example, when a shift has been completed and the target speed ratio γ* is in a certain steady state, the target shift speed becomes zero. Here, the target shift speed includes a primary target shift speed (dXin/dNelmin) and a secondary target shift speed (dXout/dNelmout).

In addition, the continuously variable transmission control unit 132 calculates the input torque $T_{IN}$ of the continuously variable transmission 18. The input torque $T_{IN}$ is, for example, calculated as a torque ($=T_E \times t$) that is obtained by multiplying the engine torque $T_E$ by the torque ratio τ of the torque converter 14 ($=$turbine torque $T_T$/pump torque $T_P$). Here, the turbine torque $T_T$ is the output torque of the torque converter 14, and the input torque $T_{IN}$ is the input torque of the torque converter 14. In addition, the continuously variable transmission control unit 132 calculates the engine torque $T_E$ on the basis of the intake air flow rate $Q_{AIR}$ and the engine rotation speed $N_E$. The engine torque $T_E$ is calculated as an estimated engine torque $T_E$es. The engine torque $T_E$ may be calculated from a known correlation (a map, an engine torque characteristic graph) empirically obtained and stored in advance. That is, the engine torque $T_E$ may be calculated from a known correlation between the engine rotation speed $N_E$ and the engine torque $T_E$ using the intake air flow rate $Q_{AIR}$ as a parameter. Here, the intake air flow rate $Q_{AIR}$ corresponds to a load required of the engine 12. In addition, instead of the intake air flow rate $Q_{AIR}$, the throttle valve opening degree $\theta_{TH}$, or the like, may be used. Alternatively, an actual output torque (actual engine torque) $T_E$ detected by a torque sensor may be, for example, used as the engine torque $T_E$. In addition, the torque ratio t of the torque converter 14 is calculated by the continuously variable transmission control unit 132 on the basis of an actual speed ratio e (=turbine rotation speed $N_T$/pump rotation speed $N_P$ (engine rotation speed $N_E$)) of the torque converter 14. The turbine rotation speed $N_T$ is the output rotation speed of the torque converter 14, and the pump rotation speed $N_P$ is the input rotation speed of the torque converter 14. Here, the torque ratio t may be calculated from a known correlation (a map, a predetermined operation characteristic graph of the torque converter 14) empirically obtained and stored in advance. For example, the known correlation is a correlation among a speed ratio e, an efficiency $\eta$, a capacity coefficient C and a torque ratio t. Note that the estimated engine torque $T_E$es is calculated so as to indicate an actual engine torque $T_E$ itself. Particularly, except that the estimated engine torque $T_E$es is distinguished from the actual engine torque $T_E$, the estimated engine torque $T_E$es is handled as the actual engine torque $T_E$. Thus, the estimated engine torque $T_E$es includes the actual engine torque $T_E$.

The continuously variable transmission control unit 132, for example, calculates a slip limit thrust force Wlmt on the basis of the actual speed ratio $\gamma$ and the input torque $T_{IN}$ of the continuously variable transmission 18. Specifically, the continuously variable transmission control unit 132 calculates a secondary pulley slip limit thrust force Woutlmt from the following mathematical expression (1) and a primary pulley slip limit thrust force Winlmt from the following mathematical expression (2). In the following mathematical expression (1) and the following mathematical expression (2), the parameters are defined as follows: $T_{IN}$ denotes the input torque of the continuously variable transmission 18 as the input torque of the primary pulley 42; $T_{OUT}$ denotes the output torque of the continuously variable transmission 18 as the input torque of the secondary pulley 46; $\alpha$ denotes a sheave angle of each of the variable pulleys 42 and 46; $\mu$in denotes a predetermined element-pulley friction coefficient of the primary pulley 42; $\mu$out denotes a predetermined element-pulley friction coefficient of the secondary pulley 46; Rin denotes a belt turning radius Rin of the primary pulley 42, uniquely calculated from the actual speed ratio $\gamma$; and Rout denotes a belt turning radius of the secondary pulley 46, uniquely calculated from the actual speed ratio $\gamma$. Note that $T_{OUT}=\gamma \times T_{IN}=$(Rout/Rin)×Tin.

$$Woutlmt=(T_{OUT} \times \cos \alpha)/(2 \times \mu out \times Rout)=(T_{IN} \times \cos \alpha)/(2 \times \mu out \times Rin) \quad (1)$$

$$Winlmt=(T_{IN} \times \cos \alpha)/(2 \times \mu in \times Rin) \quad (2)$$

The continuously variable transmission control unit 132, for example, sets the secondary pulley slip limit thrust force Woutlmt at the target secondary thrust force Wout*. The continuously variable transmission control unit 132 calculates a primary pulley shift control thrust force Winsh on the basis of the target secondary thrust force Wout*. Here, the primary pulley shift control thrust force Winsh is a primary thrust force Win required for shift control. The continuously variable transmission control unit 132 sets the calculated primary pulley shift control thrust force Winsh at a target primary thrust force Win*. In addition, the continuously variable transmission control unit 132 corrects the target primary thrust force Win* (that is, the primary pulley shift control thrust force Winsh) through feedback control over the primary thrust force Win. Here, for example, the primary thrust force Win executes feedback control on the basis of a speed ratio deviation $\Delta\gamma$ between the target speed ratio $\gamma^*$ and the actual speed ratio $\gamma$.

Note that the speed ratio deviation $\Delta\gamma$ may be a deviation between a target value and an actual value in a parameter that is in one-to-one correspondence with the speed ratio $\gamma$. For example, instead of the speed ratio deviation $\Delta\gamma$, the following deviations, and the like, may be used: a deviation $\Delta$Xin (=Xin*−Xin) between a target pulley position (target sheave position) Xin* and actual pulley position (actual sheave position) Xin of the primary pulley 42; a deviation $\Delta$Xout (=Xout*−Xout) between a target sheave position Xout* and actual sheave position Xout of the secondary pulley 46; a deviation $\Delta$Rin (=Rin*−Rin) between a target belt turning radius Rin* and actual belt turning radius Rin of the primary pulley 42; a deviation $\Delta$Rout (=Rout*−Rout) between a target belt turning radius Rout* and actual belt turning radius Rout of the secondary pulley 46; or a deviation $\Delta N_{IN}(=N_{IN}^{*}-N_{IN})$ between a target input shaft rotation speed $N_{IN}^*$ and an actual input shaft rotation speed $N_{IN}$.

In addition, the thrust force required for shift control is, for example, a thrust force required to achieve a target shift. That is, the thrust force required for shift control is a thrust force required to achieve a target speed ratio $\gamma^*$ and a target shift speed. The shift speed is, for example, a variation $d\gamma$ (=$d\gamma/dt$) in speed ratio $\gamma$ per unit time. On the other hand, in the present embodiment, the shift speed is defined as a sheave position displacement (dX/dNelm) of each belt element (block) (dX: a sheave position variation that is an axial displacement of the movable sheave per unit time, that is, a sheave position variation speed (=dX/dt) [mm/ms], dNelm: the number of elements (blocks) that are brought into mesh with the pulley per unit time [number of elements/ms]). Thus, the target shift speed is expressed by the primary target shift speed (dXin/dNelmin) and the secondary target shift speed (dXout/dNelmout). Furthermore, a thrust force in a steady state (a state where the speed ratio $\gamma$ is constant) is termed a balance thrust force (steady thrust force) Wbl. For example, the balance thrust force of the primary thrust force Win and the balance thrust force of the secondary thrust force Wout are respectively a primary balance thrust force Winbl and a secondary balance thrust force Woutbl. That is, the ratio of the primary balance thrust force Winbl to the secondary balance thrust force Woutbl is a thrust force ratio $\tau$ (=Woutbl/Winbl). In addition, when the primary thrust force Win and the secondary thrust force Wout are in a certain steady state, the speed ratio $\gamma$ is kept. In this steady state, when a certain thrust force is added to or reduced from the thrust force of any one of the pair of variable pulleys 42 and 46, the steady state collapses, and the speed ratio $\gamma$ varies. At this time, a shift speed (dX/dNelm) corresponding to the added or reduced thrust force occurs. The added or reduced thrust force is termed a shift differential thrust force (transitional thrust force) $\Delta W$ (for example, a primary shift differential thrust force $\Delta$Win and a secondary shift differential thrust force $\Delta$Wout). Thus, when one of the thrust forces is set, the thrust force required for shift control is the sum of the other balance thrust force Wbl and the shift differential thrust force $\Delta W$. Here, the other balance thrust force Wbl is a thrust force for achieving a target speed ratio $\gamma^*$ corresponding to one of the thrust forces on the basis of the thrust force ratio $\tau$ for keeping the target speed ratio $\gamma^*$. In addition, the shift differential thrust force $\Delta W$ is a thrust force for achieving a target shift speed at the time when the target speed ratio γ* is varied. The target shift speed, for example, includes a primary target shift speed (dXin/dNelmin) and a secondary target shift speed (dXout/dNelmout). In addition, the shift differential thrust force ΔW in the case where a target shift is achieved by the primary pulley 42, that is, the primary shift differential thrust force ΔWin converted for the primary pulley, is such that ΔWin>0 in an upshifting state, ΔWin<0 in a downshifting state, and ΔWin=0 in a steady state where the speed ratio is constant. In addition, the shift differential thrust force ΔW in the case where a target shift is achieved by the secondary pulley 46, that is, the secondary shift differential thrust force ΔWout converted for the secondary pulley, is such that ΔWout<0 in an upshifting state, ΔWout>0 in a downshifting state, and ΔWout=0 in a steady state where the speed ratio is constant.

Figure 7:
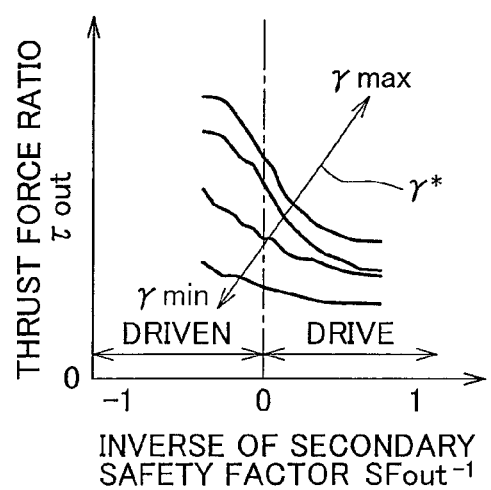
FIG. 7 is a view that shows an example of a thrust force ratio map between an inverse of a safety factor and a thrust force ratio using a target speed ratio as a parameter, empirically obtained and stored in advance.

The continuously variable transmission control unit 132 calculates a thrust force ratio τout on the basis of the sequentially calculated target speed ratio γ* and inverse $SFout^{-1}$ (=Woutlmt/Wout) of the secondary safety factor SFout (=Wout/Woutlmt). The thrust force ratio τ may be calculated from the correlation between the inverse $SFout^{-1}$ of the secondary safety factor and the thrust force ratio τout (thrust force ratio map) shown in FIG. 7 using the target speed ratio γ* as a parameter. Here, the thrust force ratio τout is a thrust force ratio used to calculate the thrust force of the primary pulley 42, corresponding to the secondary pulley 46. In addition, the correlation shown in FIG. 7 may be a correlation empirically obtained and stored in advance. Then, the continuously variable transmission control unit 132 calculates a primary balance thrust force Winbl on the basis of the target secondary thrust force Wout* and the thrust force ratio τout using the following mathematical expression (3). Note that, because the input torque $T_{IN}$ or the output torque $T_{OUT}$ is a negative value when the corresponding pulley is driven by the other, the inverse $SFin^{-1}$ of the safety factor or the inverse $SFout^{-1}$ of the safety factor is also a negative value when the corresponding pulley is driven by the other. In addition, the inverses $SFin^{-1}$ and $SFout^{-1}$ may be sequentially calculated. On the other hand, a predetermined value (for example, about 1 to 1.5) may be set to each of the safety factors SFin and SFout.

$$Winbl = Wout^*/\tau out \quad (3)$$

Figure 8:
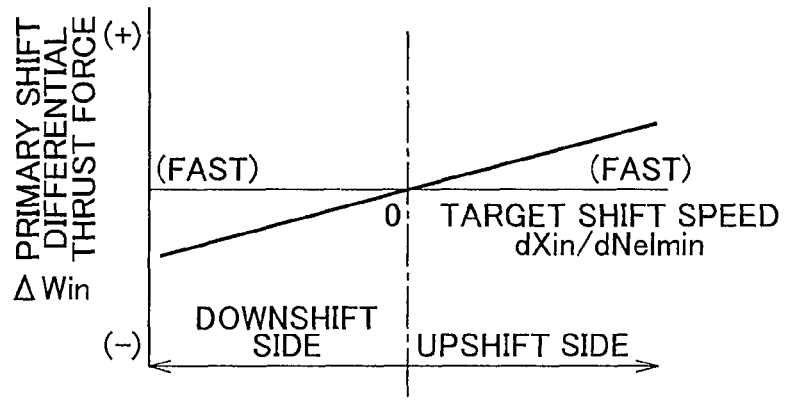
FIG. 8 is a view that shows an example of a differential thrust force map between a target shift speed and a shift differential thrust force, empirically obtained and stored in advance.

The continuously variable transmission control unit 132, for example, calculates a primary shift differential thrust force ΔWin in the case where a target shift is achieved by the primary pulley 42. The primary shift differential thrust force ΔWin is the differential thrust force ΔW converted for the primary pulley. The continuously variable transmission control unit 132 calculates a primary shift differential thrust force ΔWin on the basis of the sequentially calculated primary target shift speed (dXin/dNelmin). Specifically, the primary shift differential thrust force ΔWin may be calculated from the correlation (differential thrust force map) between the primary target shift speed (dXin/dNelmin) and the primary shift differential thrust force ΔWin, shown in FIG. 8. The differential thrust force map may be empirically obtained and stored in advance.

In addition, the continuously variable transmission control unit 132, for example, adds the primary shift differential thrust force ΔWin to the primary balance thrust force Winbl to calculate a primary pulley shift control thrust force Winsh (=Winbl+ΔWin). In addition, the continuously variable transmission control unit 132 calculates a feedback control amount (FB control correction amount) Winfb for bringing the actual speed ratio γ into coincidence with the target speed ratio γ*. The feedback control amount Winfb may be calculated using the feedback control mathematical expression empirically obtained and stored in advance as shown in the mathematical expression (4). In this mathematical expression (4), Δγ denotes a speed ratio deviation (=γ*−γ) between a target speed ratio γ* and an actual speed ratio γ, KP denotes a predetermined proportionality constant, KI denotes a predetermined integration constant, and KD denotes a predetermined differential constant. Then, the continuously variable transmission control unit 132, for example, sets a value (=Winsh+Winfb), obtained by correcting the primary pulley shift control thrust force Winsh with the feedback control amount Winfb, as the target primary thrust force Win*. The target primary thrust force Win* is a value obtained by correcting the primary pulley shift control thrust force Winsh through feedback control based on the speed ratio deviation Δγ.

$$Winfb = KP \times \Delta\gamma + KI \times (\sim\Delta\gamma dt) + KD \times (d\Delta\gamma/dt) \quad (4)$$

Note that, when the above calculated target primary thrust force Win* is smaller than the primary pulley slip limit thrust force Winlmt, the primary pulley slip limit thrust force Winlmt may be set at the target primary thrust force Win*. In this case, the secondary pulley shift control thrust force Woutsh is calculated on the basis of the target primary thrust force Win*. The secondary pulley shift control thrust force Woutsh is a secondary thrust force Wout required for shift control. Then, the calculated secondary pulley shift control thrust force Woutsh is set at the target secondary thrust force Wout*. In short, within the range in which the secondary pulley slip limit thrust force Woutlmt and the primary pulley slip limit thrust force Winlmt may be ensured, the secondary thrust Wout and the primary thrust Win at the thrust ratio τ for achieving the target speed ratio γ* just need to be set at the target secondary thrust Wout* and the target primary thrust Win*.

Then, the continuously variable transmission control unit 132 converts the target primary thrust force Win* to a target primary pressure Pin* (=target primary thrust force Win*/pressure receiving area of the movable sheave 42b) on the basis of the pressure receiving area of the movable sheave 42b. In addition, the continuously variable transmission control unit 132 converts the target secondary thrust force Wout* to a target secondary pressure Pout* (=target secondary thrust force Wout*/pressure receiving area of the movable sheave 46b) on the basis of the pressure receiving area of the movable sheave 46b. Then, the continuously variable transmission control unit 132 sets the target secondary pressure Pout* as the secondary command pressure Pouttgt, and sets the target primary pressure Pin* as the primary command pressure Pintgt.

The continuously variable transmission control unit 132, for example, outputs the primary command pressure Pintgt as the hydraulic pressure control command signal $S_{CVT}$ to the hydraulic pressure control circuit 100 so as to be able to obtain the target primary pressure Pin*. In addition, the continuously variable transmission control unit 132 outputs the secondary command pressure Pouttgt as the hydraulic pressure control command signal $S_{CVT}$ to the hydraulic pressure control circuit 100 so as to be able to obtain the target secondary pressure Pout*. The hydraulic pressure control circuit 100 operates the first linear solenoid valve SLP to regulate the primary pressure Pin and operates the second linear solenoid valve SLS to regulate the secondary pressure Pout in accordance with the hydraulic pressure control command signal $S_{CVT}$.

Referring back to FIG. 5, a garage control unit 134 executes so-called garage control. Specifically, when a garage shift is performed, the garage control unit 134 outputs a command signal for supplying the selector hydraulic pressure $P_{SC}$ from the selector valve SC to the selecting fluid chamber 102i. By so doing, a garage mode is established, the spool valve element 102a of the clutch apply control valve 102 is positioned at the garage side. At this time, in the garage mode, the garage control unit 134 outputs a command signal for varying the control hydraulic pressure $P_{SLU}$ of the fourth linear solenoid valve SLU so as to smoothly engage the forward clutch C1 (or the reverse brake B1). As described above, the control hydraulic pressure $P_{SLU}$ is an engaging transitional hydraulic pressure of the forward clutch C1 (or the reverse brake B1). Then, the garage control unit 134 cancels a command signal for supplying the selector hydraulic pressure $P_{SC}$ to the selecting fluid chamber 102i after the forward clutch C1 (or the reverse brake B1) is engaged. By so doing, the garage mode is cancelled, and the spool valve element 102a is positioned at the normal side.

A neutral control unit 136 executes so-called neutral control. Specifically, for example, during a stop of the vehicle, when a predetermined condition is satisfied, the neutral control unit 136 outputs a command signal for supplying the selector hydraulic pressure $P_{SC}$ from the selector valve SC to the selecting fluid chamber 102i. The predetermined condition is, for example, a condition that the lever position $P_{SH}$ is the "D" position (or the "R" position) or a condition that the foot brake is operated (brake on $B_{ON}$). By so doing, the garage mode is established, and the spool valve element 102a is positioned at the garage side. At this time, in the garage mode, the neutral control unit 136 outputs a command signal for setting the control hydraulic pressure $P_{SLU}$ of the fourth linear solenoid valve SLU at zero or a low pressure. The command signal is output such that the forward clutch C1 (or the reverse brake B1) is placed in a half engaged state or a released state. In addition, when the predetermined condition is not satisfied, the neutral control unit 136 cancels neutral control. When neutral control is cancelled, that is, when return control from neutral control is executed, the neutral control unit 136 outputs a command signal for varying the control hydraulic pressure $P_{SLU}$ of the fourth linear solenoid valve SLU so as to smoothly engage the forward clutch C1 (or the reverse brake B1) while maintaining the garage mode. Then, after the forward clutch C1 (or the reverse brake B1) is engaged, the neutral control unit 136 cancels a command signal for supplying the selector hydraulic pressure $P_{SC}$ to the selecting fluid chamber 102i. By so doing, the spool valve element 102a is positioned at the normal side, and the garage mode is cancelled.

A reverse inhibit control unit 138 executes so-called reverse inhibit control for, even when the shift lever is operated to the "R" position during forward running of the vehicle, prohibiting a shift into a reverse state and making a shift into a neutral state. Here, the reverse state indicates a state where the reverse brake B1 is engaged. That is, the power transmission path is switched to the reverse power transmission path. Reverse inhibit control is executed until the vehicle speed V decreases to a B1 engagement allowable vehicle speed VR or below. The B1 engagement allowable vehicle speed VR is obtained and set in advance, and the reverse brake B1 is allowed to be engaged at or below the B1 engagement allowable vehicle speed VR. Specifically, hereinafter, the case where the shift lever is operated to the "R" position at a vehicle speed V that exceeds the B1 engagement allowable vehicle speed VR during forward running of the vehicle will be described. In this case, the reverse inhibit control unit 138 outputs a command signal for supplying the selector hydraulic pressure $P_{SC}$ from the selector valve SC to the selecting fluid chamber 102i. By so doing, the garage mode is established, and the spool valve element 102a is positioned at the garage side. At this time, in the garage mode, the reverse inhibit control unit 138 outputs a command signal for setting the control hydraulic pressure $P_{SLU}$ of the fourth linear solenoid valve SLU at zero or a low pressure. By so doing, the reverse brake B1 is placed in a half engaged state or a released state. In addition, the reverse inhibit control unit 138 cancels reverse inhibit control because the vehicle speed V decreases to the B1 engagement allowable vehicle speed VR or below. When reverse inhibit control is cancelled, that is, when return control from reverse inhibit control is executed, the reverse inhibit control unit 138 outputs a command signal for varying the control hydraulic pressure $P_{SLU}$ of the fourth linear solenoid valve SLU so as to smoothly engage the reverse brake B1 while maintaining the garage mode. Then, after the reverse brake B1 is engaged, the reverse inhibit control unit 138 cancels a command signal for supplying the selector hydraulic pressure $P_{SC}$ to the selecting fluid chamber 102i. That is, the garage mode is cancelled, and the spool valve element 102a is positioned at the normal side.

Incidentally, the garage mode is established in any of the garage control, the neutral control and the reverse inhibit control, and the spool valve element 102a is positioned at the garage side. Thus, when these controls are executed, although it is not in the event of a failure in which the primary pressure Pin is not normally output, the regulated secondary pressure Pout' is supplied to the primary pulley 42 via the check valve 120 as the primary pressure Pin. That is, the primary pressure Pin regulated on the basis of the secondary pressure Pout depending on the check valve pressure control characteristic of the check valve 120 is supplied to the primary pulley 42. Then, it may be difficult to achieve the target speed ratio γ* depending on the thrust force ratio τ. Alternatively, it may be difficult to ensure the secondary pulley slip limit thrust force Woutlmt and the primary pulley slip limit thrust force Winlmt. Particularly, in garage control or neutral control (particularly, return control from neutral control) in which the vehicle presumably starts from a standstill, unless the maximum speed ratio γmax set as the target speed ratio γ* is achieved, vehicle starting performance may decrease. In addition, in return control from reverse inhibit control, when the reverse brake B1 is engaged at a speed ratio γ different from the target speed ratio γ* corresponding to the vehicle speed V at the time of return, a shock may occur.

Then, in the present embodiment, when the primary pressure Pin is regulated by the check valve 120, the secondary pressure Pout is controlled on the basis of the secondary pressure Pout and the primary pressure Pin that are required to suppress a belt slip and achieve the target speed ratio γ*.

Figure 9:
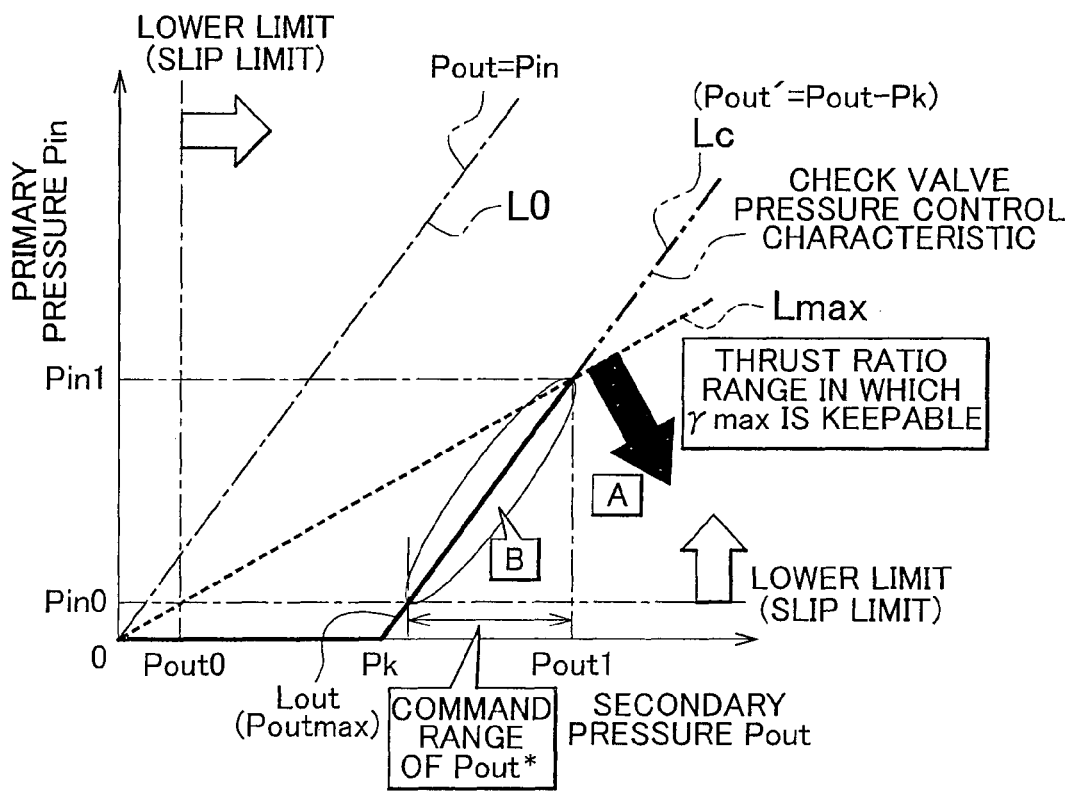
FIG. 9 is a graph for illustrating calculation of a secondary pressure.

FIG. 9 is a graph for illustrating calculation of the secondary pressure Pout. In FIG. 9, the check valve pressure control characteristic indicated by the alternate long and two short dashes line Lc is the same as the check valve pressure control characteristic (solid line Lc) of FIG. 4. A lower limit secondary pressure Pout0 is calculated in correspondence with the secondary pulley slip limit thrust force Woutlmt. That is, the lower limit secondary pressure Pout0 is obtained by dividing the secondary pulley slip limit thrust force Woutlmt by the pressure receiving area of the movable sheave 46b. In addition, a lower limit primary pressure Pin0 is calculated in correspondence with the primary pulley slip limit thrust force Winlmt. That is, the lower limit primary pressure Pin0 is obtained by dividing the primary pulley slip limit thrust force Winlmt by the pressure receiving area of the movable sheave 42b. In addition, the broken line Lmax indicates the minimum value of the thrust force ratio τ, by which the maximum speed ratio γmax may be achieved (may be kept). The region A indicates a region in which the regulated secondary pressure Pout' is higher than the secondary pressure Pout of the broken line Lmax. In addition, the region A indicates a thrust force ratio range in which the thrust force ratio τ that achieves the maximum speed ratio γmax is obtained. The check valve 120 has such a pressure control characteristic that the regulated secondary pressure Pout' increases as the secondary pressure Pout increases beyond the cracking pressure Pk. Therefore, as the secondary pressure Pout increases, it is difficult to obtain the thrust force ratio τ that gives the maximum speed ratio γmax. In the present embodiment, in a portion of the alternate long and two short dashes line Lc, which is indicated by the solid line Lout, the thrust force ratio τ that gives the maximum speed ratio γmax is obtained. The solid line Lout corresponds to the range of the secondary pressure Pout, having an upper limit secondary pressure Pout1. The intersection of the alternate long and two short dashes line Lc and the broken line Lmax corresponds to the upper limit secondary pressure Pout1. Here, the secondary pressure in the range corresponding to the solid line Lout is defined as a limit secondary pressure Poutmax. Thus, in the present embodiment, the target secondary pressure Pout* is set at the secondary pressure Pout corresponding to the range B in the solid line Lout (Poutmax) when the primary pressure Pin is regulated by the check valve 120. The range B is a range in which, in the solid line Lout, the secondary pressure Pout higher than or equal to the lower limit secondary pressure Pout0 is obtained and the primary pressure Pin higher than or equal to the lower limit primary pressure Pin0 is obtained. By setting the secondary pressure Pout as described above, a belt slip is suppressed, and the maximum speed ratio γmax as the target speed ratio γ* is achieved.

In this way, when the primary pressure Pin is regulated by the check valve 120, the continuously variable transmission control unit 132 calculates a target secondary pressure Pout* on the basis of the secondary pulley slip limit thrust force Woutlmt, the primary pulley slip limit thrust force Winlmt and the thrust force ratio τ depending on the check valve pressure control characteristic of the check valve 120 as shown in FIG. 9. Then, the continuously variable transmission control unit 132 sets the calculated target secondary pressure Pout* as the secondary command pressure Pouttgt.

More specifically, a control execution determining unit 140, for example, determines whether the garage mode is established. For example, the control execution determining unit 140 determines whether the garage mode is established on the basis of whether a command signal for supplying the selector hydraulic pressure $P_{SC}$ to the selecting fluid chamber 102i is output. In addition, the control execution determining unit 140 determines whether it is, for example, the time when the vehicle starts from a standstill. For example, the control execution determining unit 140 determines whether it is the time when the vehicle starts from a standstill on the basis of whether garage control is being executed by the garage control unit 134, whether neutral control is being executed by the neutral control unit 136 or whether return control from neutral control is being executed by the neutral control unit 136. In addition, the control execution determining unit 140 determines whether it is, for example, during vehicle running in which reverse inhibit control is being executed by the reverse inhibit control unit 138.

When the control execution determining unit 140 determines that it is the time when the vehicle starts from a standstill, the continuously variable transmission control unit 132 calculates the lower limit primary pressure Pin0 (=primary pulley slip limit thrust force Winlmt/pressure receiving area of the movable sheave 42b) on the basis of the primary pulley slip limit thrust force Winlmt. In addition, the continuously variable transmission control unit 132 calculates the lower limit secondary pressure Pout0 (=secondary pulley slip limit thrust force Woutlmt/pressure receiving area of the movable sheave 46b) on the basis of the secondary pulley slip limit thrust force Woutlmt. In addition, the continuously variable transmission control unit 132 calculates the limit secondary pressure Poutmax on the basis of the thrust force ratio τ that gives the maximum speed ratio γmax depending on the check valve pressure control characteristic of the check valve 120. Then, the continuously variable transmission control unit 132 sets the target secondary pressure Pout* within the range (see the range B in FIG. 9) of the limit secondary pressure Poutmax. The range of the limit secondary pressure Poutmax corresponds to a range in which the secondary pressure Pout higher than or equal to the lower limit secondary pressure Pout0 is obtained and the primary pressure Pin higher than or equal to the lower limit primary pressure Pin0 is obtained. For example, the continuously variable transmission control unit 132 calculates the secondary pressure Pout that becomes the maximum, minimum or intermediate value of the range of the limit secondary pressure Poutmax as the target secondary pressure Pout*. Then, the continuously variable transmission control unit 132 sets the target secondary pressure Pout* as the secondary command pressure Pouttgt.

Particularly, when the vehicle starts from a standstill, the engine torque $T_E$ may increase with depression of an accelerator, and the input torque $T_{IN}$ of the continuously variable transmission 18 may increase. Thus, with an increase in the input torque $T_{IN}$, the secondary pulley slip limit thrust force Woutlmt and the primary pulley slip limit thrust force Winlmt each increase. Accordingly, the lower limit secondary pressure Pout0 and the lower limit primary pressure Pin0 also increase. Then, as is apparent from FIG. 9, it may be difficult to achieve the secondary pressure Pout by which the thrust force ratio τ that gives the maximum speed ratio γmax is obtained. Then, when the control execution determining unit 140 determines that it is the time when the vehicle starts from a standstill, the continuously variable transmission control unit 132 suppresses the input torque $T_{IN}$ such that the secondary pressure Pout by which the maximum speed ratio γmax is set at a feasible (keepable) thrust force ratio τ is obtained. That is, the continuously variable transmission control unit 132 suppresses the input torque $T_{IN}$ such that the lower limit secondary pressure Pout0 does not exceed the upper limit secondary pressure Pout1 and the lower limit primary pressure Pin0 does not exceed the primary pressure Pin1 (see FIG. 9) corresponding to the intersection of the alternate long and two short dashes line Lc and the broken line Lmax.

When it is determined that reverse inhibit control is being executed by the reverse inhibit control unit 138, the continuously variable transmission control unit 132 controls the secondary pressure Pout such that the target speed ratio γ* is set at a feasible (keepable) thrust force ratio τ. Here, determination as to reverse inhibit control is made by the control execution determining unit 140. In addition, the target speed ratio γ* is set so as to correspond to the B1 engagement allowable vehicle speed VR that is a vehicle speed lower than a current vehicle speed V during vehicle running (for example, the maximum speed ratio γmax to near the maximum speed ratio γmax). That is, the continuously variable transmission control unit 132 calculates the secondary pressure Pout, by which the thrust force ratio τ that gives the target speed ratio γ* at the time when the reverse brake B1 is engaged is obtained, depending on the check valve pressure control characteristic of the check valve 120. Then, the continuously variable transmission control unit 132 sets the calculated secondary pressure Pout as the target secondary pressure Pout*, that is, the secondary command pressure Pouttgt.

Figure 10:
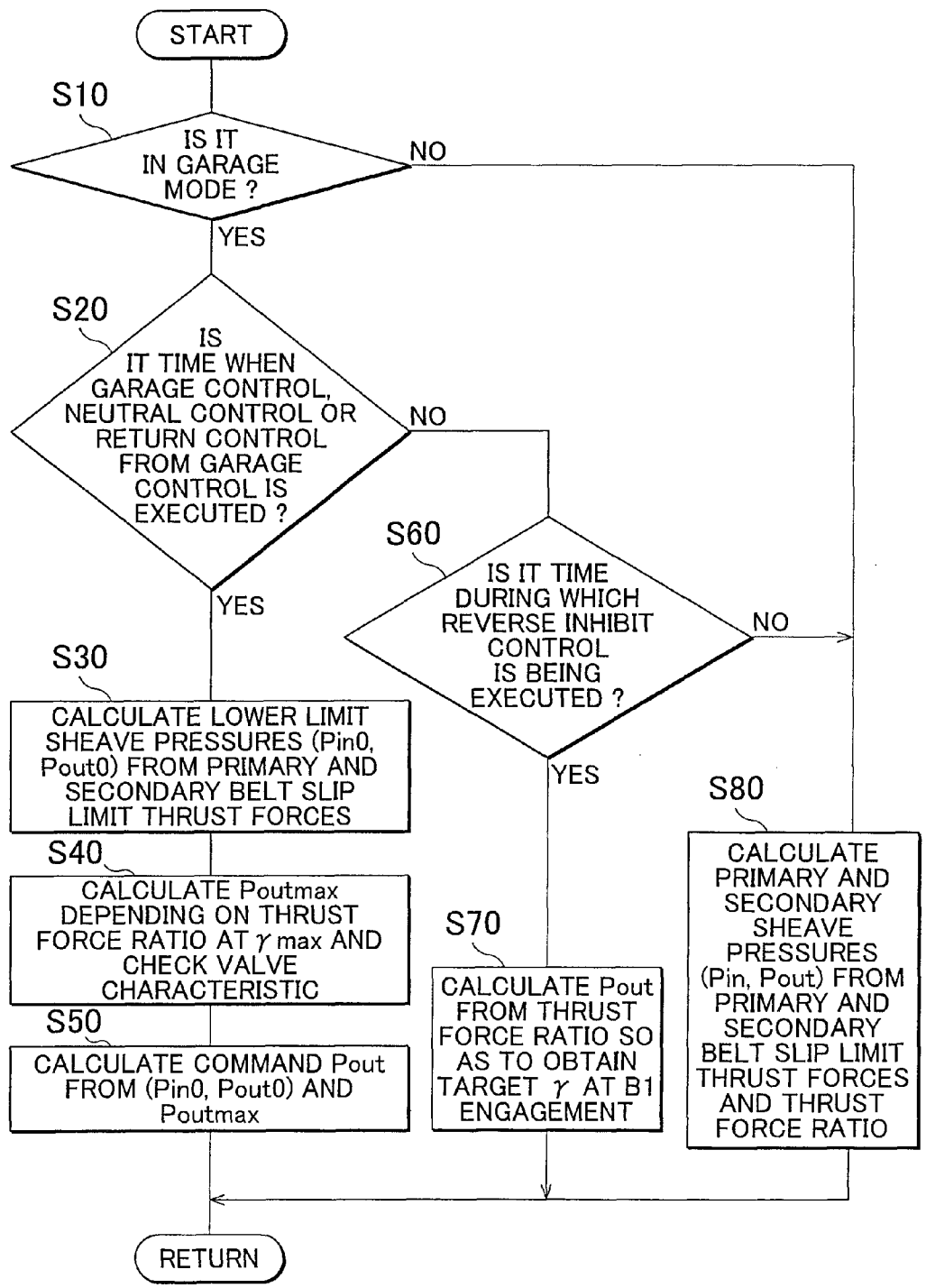
FIG. 10 is a flow chart that illustrates a relevant portion of control operations of the electronic control unit.
Figure 11:
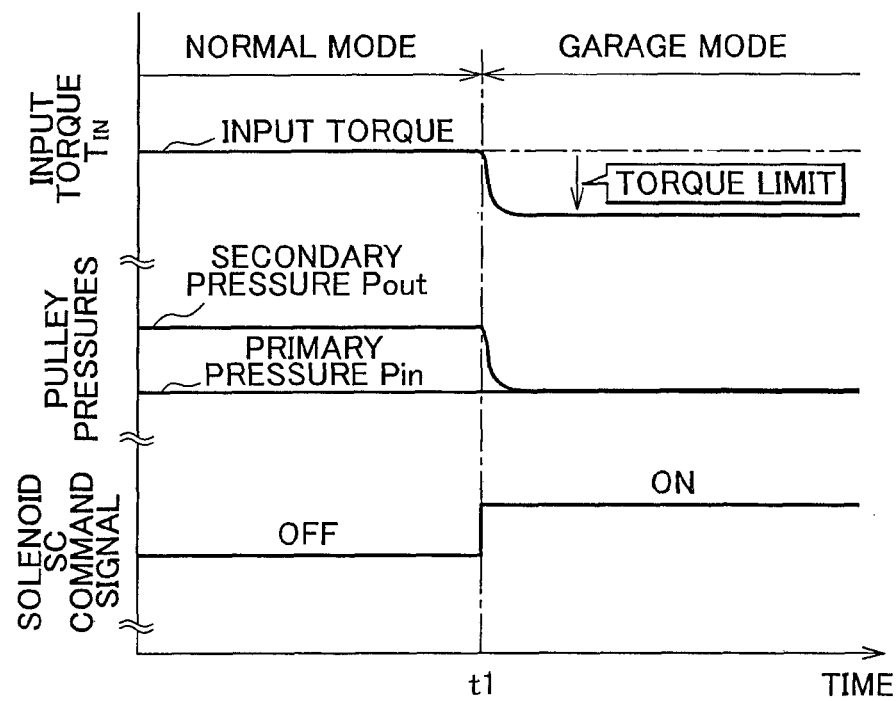
FIG. 11 is a time chart in the case where the control operations shown in the flow chart of FIG. 10 are executed, and is an embodiment in the case where a garage mode is established at the time when the vehicle starts running.

FIG. 10 is a flow chart that illustrates a relevant portion of control operations of the electronic control unit 50. The control operations of the electronic control unit 50 suppress occurrence of a belt slip and achieve the target speed ratio $\gamma^*$ when the primary pressure Pin is regulated to a predetermined pressure based on the secondary pressure Pout by the check valve 120. The control operations of the electronic control unit 50 are, for example, repeatedly executed at an extremely short cycle time of about several milliseconds to several tens of milliseconds. In addition, FIG. 11 is a time chart in the case where the control operations shown in the flow chart of FIG. 10 are executed and the garage mode is established at the time when the vehicle starts running.

In FIG. 10, first, in step (hereinafter, step is omitted) S10 corresponding to the control execution determining unit 140, it is determined whether the garage mode is established. When affirmative determination is made in S10, similarly, in S20 corresponding to the control execution determining unit 140, it is determined whether it is the time when the vehicle starts from a standstill. Control at the time when the vehicle starts from a standstill is, for example, one of garage control, neutral control and return control from neutral control. When affirmative determination is made in S20, in S30 corresponding to the continuously variable transmission control unit 132, the lower limit primary pressure Pin0 and the lower limit secondary pressure Pout0 are respectively calculated on the basis of the primary pulley slip limit thrust force Winlmt and the secondary pulley slip limit thrust force Woutlmt. Subsequently, in S40 also corresponding to the continuously variable transmission control unit 132, the limit secondary pressure Poutmax is calculated depending on the check valve pressure control characteristic of the check valve 120 on the basis of the thrust force ratio $\tau$ that gives the maximum speed ratio $\gamma$max. Subsequently, in S50 also corresponding to the continuously variable transmission control unit 132, the target secondary pressure Pout* is calculated within the range of the limit secondary pressure Poutmax, in which the secondary pressure Pout higher than or equal to the lower limit secondary pressure Pout0 is obtained and the primary pressure Pin higher than or equal to the lower limit primary pressure Pin0 is obtained. The target secondary pressure Pout* is set as the secondary command pressure Pouttgt. Note that, when affirmative determination is made in S20, in S30 to S50 corresponding to the continuously variable transmission control unit 132, the input torque $T_{IN}$ is suppressed so as to obtain the secondary pressure Pout by which the thrust force ratio $\tau$ that gives the maximum speed ratio $\gamma$max is set (from time t1 in FIG. 11). By so doing, it is possible to decrease the lower limit secondary pressure Pout0 and the lower limit primary pressure Pin0. In addition, when the primary pressure Pin relatively increases with an increase in the secondary pressure Pout, the thrust force ratio $\tau$ that gives the maximum speed ratio $\gamma$max is obtained.

On the other hand, when negative determination is made in S20, in S60 corresponding to the control execution determining unit 140, it is determined whether it is the time during which reverse inhibit control is being executed. When affirmative determination is made in S60, S70 corresponding to the continuously variable transmission control unit 132 is executed. In S70, the target secondary pressure Pout*, by which the thrust force ratio $\tau$ that gives the target speed ratio $\gamma^*$ at the time when the reverse brake B1 is engaged is obtained, is calculated from the check valve pressure control depending on of the check valve 120. Then, the target secondary pressure Pout* is set as the secondary command pressure Pouttgt. On the other hand, when negative determination is made in S10 or negative determination is made in S60, S80 corresponding to the continuously variable transmission control unit 132 is executed. In S80, within the range in which the secondary pulley slip limit thrust force Woutlmt and the primary pulley slip limit thrust force Winlmt are ensured, the target secondary pressure Pout* and the target primary pressure Pin* that give the thrust force ratio $\tau$ for achieving the target speed ratio $\gamma^*$ are calculated. Then, the target secondary pressure Pout* and the target primary pressure Pin are respectively set as the secondary command pressure Pouttgt and the primary command pressure Pintgt.

As described above, in the present embodiment, the check valve 120 that regulates the primary pressure Pin to a predetermined pressure based on the secondary pressure Pout is provided. Therefore, in comparison with the case where the primary pressure Pin and the secondary pressure Pout are configured to be equal to each other, a wider thrust force ratio $\tau$ may be obtained. By so doing, the width of a feasible speed ratio $\gamma$ is further widened. For example, it is easy to achieve the thrust force ratio $\tau$ by which the maximum speed ratio $\gamma$max is kept. In addition, when the primary pressure Pin is regulated by the check valve 120, the secondary pressure Pout is controlled on the basis of the secondary pressure Pout and the primary pressure Pin that are required to suppress a belt slip and achieve the target speed ratio $\gamma^*$. Therefore, occurrence of a belt slip is suppressed, and the target speed ratio $\gamma^*$ is achieved. For example, when the target speed ratio $\gamma^*$ is the maximum speed ratio $\gamma$max, an unnecessary upshift is suppressed.

In addition, according to the present embodiment, the target secondary pressure Pout* is calculated on the basis of the secondary pulley slip limit thrust force Woutlmt, the primary pulley slip limit thrust force Winlmt and the thrust force ratio $\tau$ for achieving the target speed ratio $\gamma^*$ depending on the check valve pressure control characteristic of the check valve 120. As described above, depending on the check valve pressure control characteristic, the secondary pressure Pout is set at a predetermined pressure corresponding to the primary pressure Pin. Therefore, within the range of the primary pressure Pin and the secondary pressure Pout in which occurrence of a belt slip is suppressed, the secondary pressure Pout that gives the thrust force ratio $\tau$ by which the target speed ratio $\gamma^*$ is kept is obtained.

In addition, according to the present embodiment, the slip limit thrust force Wlmt is calculated on the basis of the actual speed ratio $\gamma$ and the input torque $T_{IN}$ of the continuously variable transmission 18. Therefore, the slip limit thrust force Wlmt is appropriately calculated, and a thrust force required to suppress a belt slip is appropriately ensured. In addition, when the vehicle starts from a standstill, the input torque $T_{IN}$ is suppressed so as to obtain the secondary pressure Pout that gives the thrust force ratio $\tau$ for achieving the maximum speed ratio $\gamma$max. That is, a decrease in the thrust force ratio $\tau$ to below the thrust force ratio $\tau$ that gives the maximum speed ratio $\gamma$max, due to an increase of the primary pressure Pin with an increase in the secondary pressure Pout, is suppressed. By so doing, when the vehicle starts from a standstill, the maximum speed ratio $\gamma$max may be kept, so starting performance is appropriately ensured.

In addition, according to the present embodiment, during vehicle running in which reverse inhibit control is being executed, the secondary pressure Pout is controlled so as to obtain the thrust force ratio $\tau$ that gives the target speed ratio $\gamma$. The target speed ratio $\gamma^*$ is a speed ratio that is set so as to correspond to the B1 engagement allowable vehicle speed VR. Therefore, occurrence of a shock and occurrence of a belt slip at the time when the reverse brake B1 is engaged are suppressed. For example, the primary pressure Pin is regulated by the check valve 120, occurrence of a shock at the time when the speed ratio γ different from the target speed ratio τ* is established and the reverse brake B1 is engaged is suppressed.

The embodiment of the invention is described in detail above with reference to the accompanying drawings; however, the aspect of the invention may be applied to other embodiments.

For example, in the above described embodiment, the first pressure that is one of the primary pressure Pin and the secondary pressure Pout is the secondary pressure Pout, and the second pressure that is the other one of the primary pressure Pin and the secondary pressure Pout is the primary pressure Pin; instead, the aspect of the invention is not necessarily limited to this configuration. For example, between the primary pressure Pin and the secondary pressure Pout, the first pressure may be the primary pressure Pin and the second pressure may be the secondary pressure Pout. In such a case, the check valve that regulates the secondary pressure Pout to a predetermined pressure based on the primary pressure Pin is provided, and the secondary pressure Pout is supplied to the secondary pulley 46 via the clutch apply control valve 102. In this way as well, the present embodiment may be applied.

In addition, in the above described embodiment, the torque converter 14 that includes the lock-up clutch 26 is used; however, the lock-up clutch 26 may not be necessarily provided. In addition, instead of the torque converter 14, another fluid transmission device, such as a fluid coupling having no torque amplification function, may be used. In addition, when an alternative mechanism or device, or the like, alternates to the fluid transmission device is provided, the fluid transmission device does not need to be provided. The alternative mechanism or device, for example, is a starting mechanism that is forward-reverse switching device functions, start clutch, or the like, or an engaging device that is able to allow or interrupt a power transmission path.

In the aspect of the invention, the hydraulic pressure control circuit may be configured to independently control the pulley pressure applied to the input-side variable pulley and the pulley pressure applied to the output-side variable pulley. In this case, the input-side thrust force and the output-side thrust force are directly or indirectly controlled.

Note that the above described embodiment is just illustrative, and the aspect of the invention may be implemented in various forms with modifications and improvements on the basis of the knowledge of a person skilled in the art.

The invention claimed is:

1. A control device for a vehicle continuously variable transmission, the vehicle continuously variable transmission including:
an input-side variable pulley of which an effective diameter is variable; an output-side variable pulley of which an effective diameter is variable;
a transmission belt that is wound between the input-side variable pulley and the output-side variable pulley;
a check valve that, on a basis of a first pressure that is one of an input-side pressure applied to the input-side variable pulley and an output-side pressure applied to the output-side variable pulley, regulates a second pressure that is the other one of the input-side pressure and the output-side pressure, the check valve reducing the first pressure so as to output a regulated pressure as the second pressure; and
a control valve that has an input port and an output port and outputs the regulated pressure input via the input port to the output port as the second pressure,
the control device comprising
a control unit that, when the regulated pressure is output by the check valve, controls the first pressure on a basis of a pressure required to suppress a slip of the transmission belt and a pressure required to achieve a target speed ratio.

2. The control device according to claim 1, wherein:
the pressure required to suppress the slip of the transmission belt corresponds to an input-side required thrust force applied to the input-side variable pulley and an output-side required thrust force applied to the output-side variable pulley;
the input-side required thrust force is larger than an input-side thrust force at which the slip of the transmission belt occurs;
the output-side required thrust force is larger than an output-side thrust force at which the slip of the transmission belt occurs; and
the pressure required to achieve the target speed ratio corresponds to input-side and output-side thrust forces by which the target speed ratio is kept.

3. The control device according to claim 2, wherein:
the control unit sets the first pressure depending on a pressure control characteristic of the check valve on a basis of the input-side required thrust force, the output-side required thrust force, and a thrust force ratio required to achieve the target speed ratio; and
the thrust force ratio is obtained by dividing an output-side thrust force applied to the output-side variable pulley by an input-side thrust force applied to the input-side variable pulley.

4. The control device according to claim 3, wherein:
the control unit calculates the input-side required thrust force and the output-side required thrust force on a basis of an actual speed ratio and an input torque of the vehicle continuously variable transmission, and
the control unit, when a vehicle including the control device starts from a standstill, suppresses the input torque so as to obtain the first pressure that gives a thrust force ratio by which a bottom speed ratio is kept.

5. The control device according to claim 3, wherein, while a vehicle including the control device is running in a power transmission cut-off state in which switching to a reverse power transmission path is prohibited, the control unit controls the first pressure so as to obtain a thrust force ratio by which a target speed ratio set at an allowable vehicle speed at which switching to the reverse power transmission path is allowed is kept.

6. The control device according to claim 3, wherein:
the input-side required thrust force is an input-side slip limit thrust force that is slightly larger than the input-side thrust force at which the slip of the transmission belt occurs; and
the output-side required thrust force is an output-side slip limit thrust force that is slightly larger than the output-side thrust force at which the slip of the transmission belt occurs.

7. The control device according to claim 6, wherein the control unit sets the first pressure so as to fall within a pressure range in which the input-side required thrust force, the output-side required thrust force and thrust force ratio required to achieve the target speed ratio are obtained.

* * * * *